(12) United States Patent
Otani et al.

(10) Patent No.: US 9,340,147 B2
(45) Date of Patent: May 17, 2016

(54) VEHICLE LAMP

(71) Applicants: Tomoaki Otani, Shizuoka (JP); Naoki Uchida, Shizuoka (JP); Hiroki Kawai, Shizuoka (JP)

(72) Inventors: Tomoaki Otani, Shizuoka (JP); Naoki Uchida, Shizuoka (JP); Hiroki Kawai, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 483 days.

(21) Appl. No.: 13/688,689

(22) Filed: Nov. 29, 2012

(65) Prior Publication Data

US 2013/0135887 A1 May 30, 2013

(30) Foreign Application Priority Data

Nov. 29, 2011 (JP) ................. 2011-260242
Nov. 29, 2011 (JP) ................. 2011-260243
Feb. 27, 2012 (JP) ................. 2012-040760
Feb. 27, 2012 (JP) ................. 2012-040761

(51) Int. Cl.
*B60Q 1/00* (2006.01)
*F21S 8/10* (2006.01)

(52) U.S. Cl.
CPC ............. *B60Q 1/00* (2013.01); *F21S 48/1154* (2013.01); *F21S 48/1225* (2013.01); *F21S 48/137* (2013.01); *F21S 48/1329* (2013.01); *F21S 48/1388* (2013.01); *F21S 48/1394* (2013.01)

(58) Field of Classification Search
CPC . F21S 48/115; F21S 48/1159; F21S 48/1154; F21S 48/12; F21S 48/1233; F21S 48/1241; F21V 5/04; F21V 5/046; F21V 5/048; F21V 7/0066
USPC .................................... 362/487, 511
See application file for complete search history.

(56) References Cited

U.S. PATENT DOCUMENTS

| 3,970,836 | A | | 7/1976 | Ricard | |
|---|---|---|---|---|---|
| 4,792,682 | A | * | 12/1988 | Endou et al. | ........... 250/338.3 |
| 4,835,380 | A | * | 5/1989 | Opheij et al. | ........... 250/216 |
| 5,841,596 | A | * | 11/1998 | Perlo et al. | ........... 359/859 |
| 6,896,381 | B2 | * | 5/2005 | Benitez et al. | ........... 359/858 |

(Continued)

FOREIGN PATENT DOCUMENTS

| JP | S50-97041 A | 8/1975 |
|---|---|---|
| JP | 36-309904 A | 11/1994 |

(Continued)

OTHER PUBLICATIONS

Patent Abstracts of Japan, Publication No. 2011-100692, Dated May 19, 2011 (1 Page).

(Continued)

*Primary Examiner* — Evan Dzierzynski
*Assistant Examiner* — Christopher E Dunay
(74) *Attorney, Agent, or Firm* — Osha Liang LLP

(57) ABSTRACT

A vehicle lamp includes a light emitting element and a light transmissive member disposed closer to a front side of the lamp than the light emitting element. The light transmissive member includes a front surface formed into a flat plane and a rear surface having a light entering area and an annular area situated on an outer circumferential side of the light entering area. The annular area has a plurality of curved planes and a reflecting film formed thereon. The light transmissive member has a lens portion provided on one of the front surface or the rear surface of the light transmissive member and configured to cause part of the light which is emitted from the light emitting element and enters the light transmissive member to be emitted towards the front side of the lamp as direct emitted light that is upwardly oriented.

9 Claims, 21 Drawing Sheets

(56) References Cited

U.S. PATENT DOCUMENTS

| | | | |
|---|---|---|---|
| 8,631,787 B2* | 1/2014 | Benitez et al. | 126/689 |
| 2004/0001343 A1* | 1/2004 | Albou | 362/520 |
| 2004/0257826 A1* | 12/2004 | Tatsukawa | 362/544 |
| 2006/0124835 A1* | 6/2006 | Kiyomoto et al. | 250/216 |
| 2006/0268576 A1* | 11/2006 | Matsui | G02B 6/0031 362/613 |
| 2009/0213607 A1* | 8/2009 | Tatsukawa | 362/511 |
| 2012/0201043 A1* | 8/2012 | DiPenti et al. | 362/545 |
| 2014/0022804 A1* | 1/2014 | Konishi | 362/487 |

FOREIGN PATENT DOCUMENTS

| | | |
|---|---|---|
| JP | H1125706 A | 1/1999 |
| JP | I-111-329008 A | 11/1999 |
| JP | 2001-023419 A | 1/2001 |
| JP | 2009-146665 A | 7/2009 |
| JP | 2009-224303 A | 10/2009 |
| JP | 2009-238470 A | 10/2009 |
| JP | 2011-100692 A | 5/2011 |
| JP | 2011-181342 A | 9/2011 |

OTHER PUBLICATIONS

Office Action issued in corresponding Chinese Application No. 201210497420.6, mailed Sep. 28, 2014 (16 pages).

Notification of Reasons for Refusal issued in corresponding Japanese Application No. 1012-040760, mailed on Oct. 20, 2015 (8 pages).

Notification of Reasons for Refusal issued in corresponding Japanese Application No. 2012-040761, mailed on Nov. 10, 2015 (8 pages).

* cited by examiner

VEHICLE LAMP

CROSS-REFERENCE TO RELATED APPLICATION(S)

The present application claims the benefit of priorities of Japanese Patent Application No. 2011-260242, filed on Nov. 29, 2011, Japanese Patent Application No. 2011-260243, filed on Nov. 29, 2011, Japanese Patent Application No. 2012-40760, filed on Feb. 27, 2012, and Japanese Patent Application No. 2012-40761, filed on Feb. 27, 2012. The disclosures of these applications are incorporated herein by reference.

BACKGROUND

1. Technical Field

The present invention relates to a vehicle lamp configured so that light emitted from a light emitting element such as a light emitting diode is emitted to the front of the lamp by a light transmissive member that is disposed ahead of the light emitting element.

2. Related Art

There have been known vehicle lamps in which light from a light emitting element that is disposed to be directed to the front of the lamp is emitted to the front of the lamp by a light transmissive member that is disposed ahead of the light emitting element so as to form a light distribution pattern having a cut-off line at an upper end portion thereof.

As one of vehicle lamps like the one described above, "Patent Literature 1" describes a vehicle lamp having a configuration in which light emitted from a light emitting element is caused to enter a light transmissive member so that the light is internally reflected on a front surface and is then internally reflected again on a rear surface for emission from the front surface of the light transmissive member.

As this occurs, in the vehicle lamp described in "Patent Literature 1," the front surface of the light transmissive member is formed into a flat plane, and an annular area that is situated on an outer circumferential side of a light entering area on the rear surface of the light transmissive member where light from the light emitting element is caused to enter is made up of a plurality of curved planes. Additionally, a reflecting treatment is applied to the annular area.

RELATED ART LITERATURE

Patent Literature

[Patent Literature 1] JP-A-2011-100692

By adopting the configuration described in "Patent Literature 1" the vehicle lamp can be made thin, and the light distribution pattern can be formed which has the cut-off line at the upper end portion thereof. Then, the light distribution pattern so formed can be used as a low beam light distribution pattern or a light distribution pattern that makes up a part of the low beam light distribution pattern.

Incidentally, as a low beam light distribution pattern, it is preferable that a light distribution pattern is additionally formed which illuminates an overhead sign that is placed above a road surface lying ahead of a vehicle. However, with the configuration described in "Patent Literature 1" above, it is difficult to form a light distribution pattern for illuminating an overhead sign in a position which is spaced upwardly away from the cut-off line of the low beam light distribution pattern.

SUMMARY

One or more exemplary embodiments of the present invention provide a vehicle lamp configured so that light from a light emitting element is emitted to the front of the lamp by a light transmissive member disposed ahead of the light emitting element, wherein with the lamp made thin, a first light distribution pattern having a cut-off line at an upper end portion thereof and a second light distribution pattern in a position which is spaced upwardly away from the cut-off line can be formed by light emitted from the lamp.

The exemplary embodiments of the invention provide various configurations of a light transmissive member.

Namely, according to a first aspect of the invention, there is provided a vehicle lamp including:

a light emitting element disposed to be directed to a front side of the lamp; and a light transmissive member disposed closer to the front side of the lamp than the light emitting element, the light transmissive member comprising a front surface formed into a flat plane and a rear surface having a light entering area where light from the light emitting element is caused to enter and an annular area situated on an outer circumferential side of the light entering area, the annular area having a plurality of curved planes and having a reflecting film formed thereon, wherein:

the light emitting element and the light transmissive member are configured and arranged so that light which is emitted from the light emitting element and enters the light transmissive member is internally reflected on the front surface of the light transmissive member and is then internally reflected again on the rear surface of the light transmissive member for emission from the front surface of the light transmissive member to thereby form a first light distribution pattern having a cut-off line at an upper end portion thereof; and the light transmissive member has a lens portion provided on one of the front surface or the rear surface of the light transmissive member and configured to cause part of the light which is emitted from the light emitting element and enters the light transmissive member to be emitted towards the front side of the lamp as direct emitted light that is upwardly oriented so as to form a second light distribution pattern in a position that is spaced upwardly away from the cut-off line.

Additionally, according to a second aspect of the invention, there is provided a vehicle lamp including:

a light emitting element disposed to be directed to a front side of the lamp; and a light transmissive member disposed closer to the front side of the lamp than the light emitting element, the light transmissive member comprising a front surface formed into a paraboloidal plane having a concavely curved surface portion in a center thereof and a rear surface having a light entering area where light from the light emitting element is caused to enter and an annular area situated on an outer circumferential side of the light entering area, the annular area having a plurality of curved planes and having a reflecting film formed thereon, wherein:

the light emitting element and the light transmissive member are configured and arranged so that light which is emitted from the light emitting element and enters the light transmissive member is internally reflected on the front surface of the light transmissive member and is then internally reflected again on the rear surface of the light transmissive member for emission from the front surface of the light transmissive member to thereby form a first light distribution pattern having a cut-off line at an upper end portion thereof; and the light transmissive member has a lens portion provided on one of the front surface or the rear surface of the light transmissive member and configured to cause part of the light which is emitted from the light emitting element and enters the light transmissive member to be emitted towards the front side of the lamp as direct emitted light that is upwardly oriented so as to form a second light distribution pattern in a position that is spaced upwardly away from the cut-off line.

In addition, according to a third aspect of the invention, there is provided a vehicle lamp including:

a light emitting element disposed to be directed to a front side of the lamp; and a light transmissive member disposed closer to the front side of the lamp than the light emitting element, the light transmissive member comprising a front surface formed into a flat plane and a rear surface having a light entering area where light from the light emitting element is caused to enter and an annular area situated on an outer circumferential side of the light entering area, the annular area having a plurality of curved planes and having a reflecting film formed thereon, wherein:

the light emitting element and the light transmissive member are configured and arranged so that light which is emitted from the light emitting element and enters the light transmissive member is internally reflected on the front surface of the light transmissive member and is then internally reflected again on the rear surface of the light transmissive member for emission from the front surface of the light transmissive member to thereby form a first light distribution pattern having a cut-off line at an upper end portion thereof; and the light transmissive member has one of a lens portion or a reflecting portion provided on one of the front surface or the rear surface of the light transmissive member and configured to cause part of the light which is emitted from the light emitting element and is internally reflected again on the rear surface of the light transmissive member to be emitted towards the front side of the lamp as light that is upwardly oriented so as to form a second light distribution pattern in a position that is spaced upwardly away from the cut-off line.

Additionally, according to a fourth aspect of the invention, there is provided a vehicle lamp including:

a light emitting element disposed to be directed to a front side of the lamp; and a light transmissive member disposed closer to the front side of the lamp than the light emitting element, the light transmissive member comprising a front surface formed into a paraboloidal plane having a concavely curved surface portion in a center thereof and a rear surface having a light entering area where light from the light emitting element is caused to enter and an annular area situated on an outer circumferential side of the light entering area, the annular area having a plurality of curved planes and having a reflecting film formed thereon, wherein:

the light emitting element and the light transmissive member are configured and arranged so that light which is emitted from the light emitting element and enters the light transmissive member is internally reflected on the front surface of the light transmissive member and is then internally reflected again on the rear surface of the light transmissive member for emission from the front surface of the light transmissive member to thereby form a first light distribution pattern having a cut-off line at an upper end portion thereof; and the light transmissive member has one of a lens portion or a reflecting portion provided on one of the front surface or the rear surface of the light transmissive member and configured to cause part of the light which is emitted from the light emitting element and is internally reflected again on the rear surface of the light transmissive member to be emitted towards the front side of the lamp as light that is upwardly oriented so as to form a second light distribution pattern in a position that is spaced upwardly away from the cut-off line.

There is imposed no particular limitation on the specific shape and size of a light emitting surface of the "light emitting element" as long as the "light emitting element" is disposed so that the light emitting surface is directed to the front of the lamp.

There is imposed no particular limitation on the specific shape of the "first light distribution pattern" as long as the light distribution pattern has the cut-off line at the upper end portion thereof. The "first light distribution pattern" may be a low beam light distribution pattern or may be a light distribution pattern that makes up a part of the low beam light distribution pattern.

There is imposed no particular limitation on the specific surface configuration and disposition of each of the plurality of curved planes that make up the "annular area" as long as the "annular area" is configured so as to form the first light distribution pattern with the light that is internally reflected again on the annular area.

There is imposed no particular limitation on the specific shape and forming position of the "second light distribution pattern" as long as the "second light distribution pattern" is a light distribution that is formed in the position spaced upwardly away from the cut-off line of the first light distribution pattern.

There is imposed no particular limitation on the specific disposition of the "lens portion" as long as the "lens portion" is provided on the front surface or the rear surface of the light transmissive member. In addition, this "lens portion" may be formed integrally with the light transmissive member or may be formed separately therefrom.

There is imposed no specific limitation on the specific disposition of the "lens portion or reflecting portion" as long as they are provided on the front surface or the rear surface of the light transmissive member, and in disposing them, a configuration may be adopted in which both the "lens portion" and the "reflecting portion" are provided. In addition, in the case of the "lens portion," the "lens portion" may be formed integrally with or separately from the light transmissive member.

As described in one of the configurations above, in the vehicle lamp according to the first aspect of the invention, the light emitted from the light emitting element that is disposed to be directed to the front of the lamp is caused to enter the light transmissive member that is disposed ahead of the light emitting element in such a manner that the light is internally reflected on the front surface and is then internally reflected again on the rear surface of the light transmissive member for emission from the front surface of the light transmissive member. Then, the light transmissive member is configured so that the front surface is formed into the flat plane and the annular area that is situated on the outer circumferential side of the light entering area on the rear surface of the light transmissive member is made up of the plurality of curved planes, and the reflecting treatment is applied to this annular area. Therefore, the vehicle lamp can be made thin, and then, it is possible to form the first light distribution pattern having the cut-off line at the upper end portion thereof.

In addition to this, in the vehicle lamp according to the first aspect of the invention, the lens portion is provided on the front surface or the rear surface of the light transmissive member, and the lens portion is made to cause part of the light that is emitted from the light emitting element and which enters the light transmissive member to be emitted towards the front of the lamp as direct emitted light that is upwardly oriented so as to form the second light distribution pattern in the position that is spaced upwardly away from the cut-off line. Therefore, an overhead sign placed above a road surface lying ahead of the vehicle can easily be illuminated.

In addition, in the vehicle lamp according to the second aspect of the invention, the light emitted from the light emitting element that is disposed to be directed to the front of the lamp is caused to enter the light transmissive member that is disposed ahead of the light emitting element in such a manner that the light is internally reflected on the front surface and is then internally reflected again on the rear surface of the light transmissive member for emission from the front surface of the light transmissive member. Then, in the light transmissive member, the front surface is formed into the paraboloidal plane having the concavely curved surface portion in the center thereof, and the annular area that is situated on the outer circumferential side of the light entering area on the rear surface of the light transmissive member where light from the light emitting element is caused to enter is made up of the plurality of curved planes. Additionally, the reflecting treatment is applied to the annular area. Therefore, the vehicle lamp can be made thin, and then, it is possible to form the first light distribution pattern having the cut-off line at the upper end portion thereof.

In addition to this, in the vehicle lamp according to the second aspect of the invention, the lens portion is provided on the front surface or the rear surface of the light transmissive member, and the lens portion is made to cause part of the light that is emitted from the light emitting element and which enters the light transmissive member to be emitted towards the front of the lamp as the direct emitted light that is upwardly oriented so as to form the second light distribution pattern in the position that is spaced upwardly away from the cut-off line. Therefore, an overhead sign placed above a road surface lying ahead of the vehicle can easily be illuminated.

In this way, according to the aspects of the invention, in the vehicle lamp configured so that light emitted from the light emitting element is emitted to the front of the lamp by the light transmissive member that is disposed ahead of the light emitting element, the lamp is made thin. In addition to this, the first light distribution pattern having the cut-off line at the upper end portion thereof can be formed by the light that is so emitted and the second light distribution pattern can be formed in the position that is spaced upwardly away from the cut-off line.

In the configuration described above, in the event that a reflecting treatment is applied to a central area on the front surface of the light transmissive member, more light can be internally reflected towards the rear surface of the light transmissive member.

In particular, in the vehicle lamp according to the second aspect of the invention, the front surface of the light transmissive member is formed into the paraboloidal plane having the concavely curved surface portion in the center thereof. Therefore, the area on the front surface where a total reflection occurs becomes larger than where the front surface is formed into the flat plane. Because of this, the size of the central area to which the reflecting treatment is applied can be reduced. Consequently, the range of the annular area on the rear surface of the light transmissive member to which the reflecting treatment is applied can be spread towards an inner circumferential side to such an extent that the size of the central area is reduced, thereby making it possible to realize an effective use of light.

With the front surface of the light transmissive member formed into the paraboloidal plane having the concavely curved surface portion in the center, in the event that a configuration is adopted in which a lens portion is formed on the light entering area on the rear surface of the light transmissive member and a portion on the central area on the front surface of the light transmissive member where light that is emitted from the light emitting element and which enters from the lens portion reaches is formed into a non-reflecting treatment-applied portion to which the reflecting treatment is not applied, the aforesaid function and advantage can be obtained without providing a projecting portion on the light transmissive member.

As this occurs, since not all the light that is emitted from the light emitting element and which is internally reflected on the central area reaches the annular area on the rear surface of the light transmissive member, in the event that the portion where light that is emitted from the light emitting element and which enters from the lens portion reaches is set in a position where the internally reflected light is prevented from being directed towards the annular area, it is possible to obtain direct emitted light that is oriented upwardly to form the second light distribution pattern without reducing the internally reflected light that is directed towards the annular area.

In the configurations described above, in the event that a configuration is adopted in which a lens portion is formed on the front surface of the light transmissive member, the following functions and advantages can be obtained.

Namely, in the vehicle lamp according to the first aspect of the invention, since the front surface of the light transmissive member is formed into the flat plane, by forming the lens portion on the front surface, the lens portion can easily be formed with good accuracy. On the other hand, in the vehicle lamp according to the second aspect of the invention, since the front surface of the light transmissive member is formed into the paraboloidal plane having the concavely curved surface portion in the center thereof, even in the event that the lens portion is formed on the front surface, the forward projection of the light transmissive member resulting from the formation of the lens portion can be suppressed, so that the vehicle lamp can easily be kept thin.

In this case, although there is imposed no particular limitation on the position on the front surface of the light transmissive member where the lens portion is formed, in the event that with a reflecting treatment applied to the central area of the front surface of the light transmissive member, part of the central area is configured as a non-reflecting treatment-applied area and that the lens portion is formed on this non-reflecting treatment-applied area, the following function and advantage can be obtained.

Namely, as has been described above, by applying the reflecting treatment to the central area on the front surface of the light transmissive member, more light can be internally reflected towards the rear surface of the light transmissive member. However, in the event that a lens portion is formed on an outer circumferential portion of the central area on the front surface of the light transmissive member in that configuration, no light is internally reflected towards the rear surface of the light transmissive member at the portion where the lens portion is so formed, which reduces the light utilization efficiency accordingly.

In contrast with what has been described just above, as has been described before, not all the light that is emitted from the light emitting element and which is internally reflected on the central area reaches the annular area on the rear surface of the light transmissive member. Thus, by selecting appropriately where to dispose the non-reflecting treatment-applied portion on the central area, it is possible to obtain direct emitted light that is oriented upwardly to form the second light distribution pattern without reducing the internally reflected light that is directed towards the annular area.

In addition, in the vehicle lamp according to the third aspect of the invention, the light emitted from the light emitting element that is disposed to be directed to the front of the lamp is caused to enter the light transmissive member that is disposed ahead of the light emitting element in such a manner that the light is internally reflected on the front surface and is then internally reflected again on the rear surface of the light transmissive member for emission from the front surface of the light transmissive member. Additionally, the front surface of the light transmissive member is formed into the flat plane, and the annular area that is situated on the outer circumferential side of the light entering area on the rear surface of the light transmissive member is made up of the plurality of curved planes. Then, the reflecting treatment is applied to the annular area. Thus, the vehicle lamp can be made thin, and in addition to this, the first light distribution pattern having the cut-off line at the upper end portion thereof can be formed.

In addition to this, in the vehicle lamp according to the third aspect of the invention, the lens portion or the reflecting portion is provided on the front surface or the rear surface of the light transmissive member in such a manner that part of the light that is emitted from the light emitting element and which is internally reflected again on the rear surface of the light transmissive member is caused to be emitted forwards as light that is upwardly oriented so as to form the second light distribution pattern in the position that is spaced upwardly away from the cut-off line. Therefore, an overhead sign placed above a road surface lying ahead of the vehicle can easily be illuminated.

In addition, in the vehicle lamp according to the fourth aspect of the invention, the light emitted from the light emitting element that is disposed to be directed to the front of the lamp is caused to enter the light transmissive member that is disposed ahead of the light emitting element in such a manner that the light is internally reflected on the front surface and is then internally reflected again on the rear surface of the light transmissive member for emission from the front surface of the light transmissive member. Additionally, the front surface of the light transmissive member is formed into the paraboloidal plane having the concavely curved surface portion in the center thereof, and the annular area that is situated on the outer circumferential side of the light entering area on the rear surface of the light transmissive member is made up of the plurality of curved planes, and the reflecting treatment is applied to this annular area. Thus, the vehicle lamp can be made thin, and in addition to this, the first light distribution pattern having the cut-off line at the upper end portion thereof can be formed.

In addition to this, in the vehicle lamp according to the fourth aspect of the invention, the lens portion or the reflecting portion is provided on the front surface or the rear surface of the light transmissive member in such a manner that part of the light that is emitted from the light emitting element and which is internally reflected again on the rear surface of the light transmissive member is caused to be emitted forwards as light that is upwardly oriented so as to form the second light distribution pattern in the position that is spaced upwardly away from the cut-off line. Thus, an overhead sign placed above a road surface lying ahead of the vehicle can easily be illuminated.

In this way, according to the invention, in the vehicle lamp configured so that light from the light emitting element is emitted to the front of the lamp by the light transmissive member that is disposed ahead of the light emitting element, the vehicle lamp can be made thin. In addition to this, it is possible to form not only the first light distribution pattern having the cut-off line at the upper end portion thereof but also the second light distribution pattern in the position that is spaced upwardly away from the cut-off line by the light emitted from the vehicle lamp.

In the configurations described above, in the event that a configuration is adopted in which the light emitting element has a horizontally elongated rectangular shape and additionally, the lens portion or the reflecting portion is provided as a cross-shaped area which extends in a belt-like fashion vertically and horizontally about the center of the light emitting element when looking at the lamp from the front thereof, the following function and advantage can be obtained.

Namely, in the case of the light emitting element having the horizontally elongated substantially rectangular shape, in light source images that are formed by the light that is internally reflected again on the annular area on the rear surface to be emitted from the front surface of the light transmissive member, the shape of a light source image that is formed by the light emitted from the cross-shaped area that extends in the belt-like fashion vertically and horizontally about the center of the light emitting element when looking at the lamp from the front thereof is maintained to a shape resembling the horizontally elongated substantially rectangular shape.

Consequently, in the event that a configuration is adopted in which the lens portion or the reflecting portion is provided on the cross-shaped area, the second light distribution pattern can easily be formed into a horizontally elongated light distribution pattern which is suitable for illumination of an overhead sign.

In this configuration, in the event that the lens portion is formed on the front surface of the light transmissive member, the following functions and advantages can be obtained.

Namely, in the vehicle lamp according to the third aspect of the invention, since the front surface of the light transmissive member is formed into the flat plane, by forming the lens portion on the front surface, the lens portion can easily be formed with good accuracy. On the other hand, in the vehicle lamp according to the fourth aspect of the invention, since the front surface of the light transmissive member is formed into the paraboloidal plane having the concavely curved surface portion in the center thereof, even in the event that the lens portion is formed on the front surface, the forward projection of the light transmissive member resulting from the formation of the lens portion can be suppressed enough to maintain the vehicle lamp thin with ease.

In the configurations described above, in the event that a configuration is adopted in which the lens portion is mounted on the front surface of the light transmissive member as a separate lens member, in the vehicle lamp according to the third aspect of the invention, since the front surface is formed into the flat plane, the lens portion can be disposed with good accuracy. Moreover, by configuring the lens portion as the lens member that is separate from the light transmissive member in that way, the formation of the second light distribution pattern can be selected by selecting the mounting or dismounting of the lens member.

In the configurations described above, in the event that a configuration is adopted in which the reflecting portion is formed on the annular area on the rear surface of the light transmissive member, the above functions and advantages can be obtained without providing the projecting portion on the light transmissive member.

DETAILED DESCRIPTION

Figure 1:
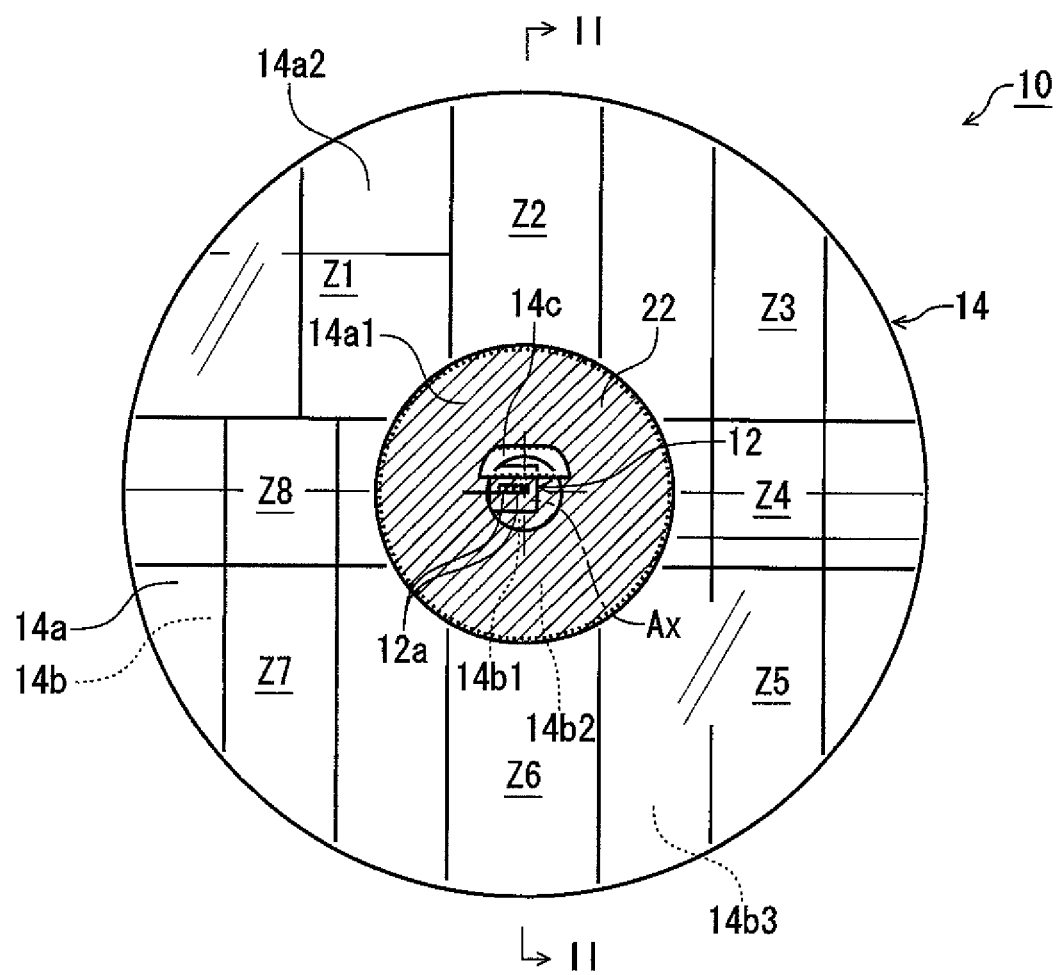
FIG. 1 is a front view of a vehicle lamp according to a first embodiment of the invention.

Hereinafter, referring to the drawings, exemplary embodiments of the invention will be described.

Firstly, a first embodiment of the invention will be described.

Figure 2:
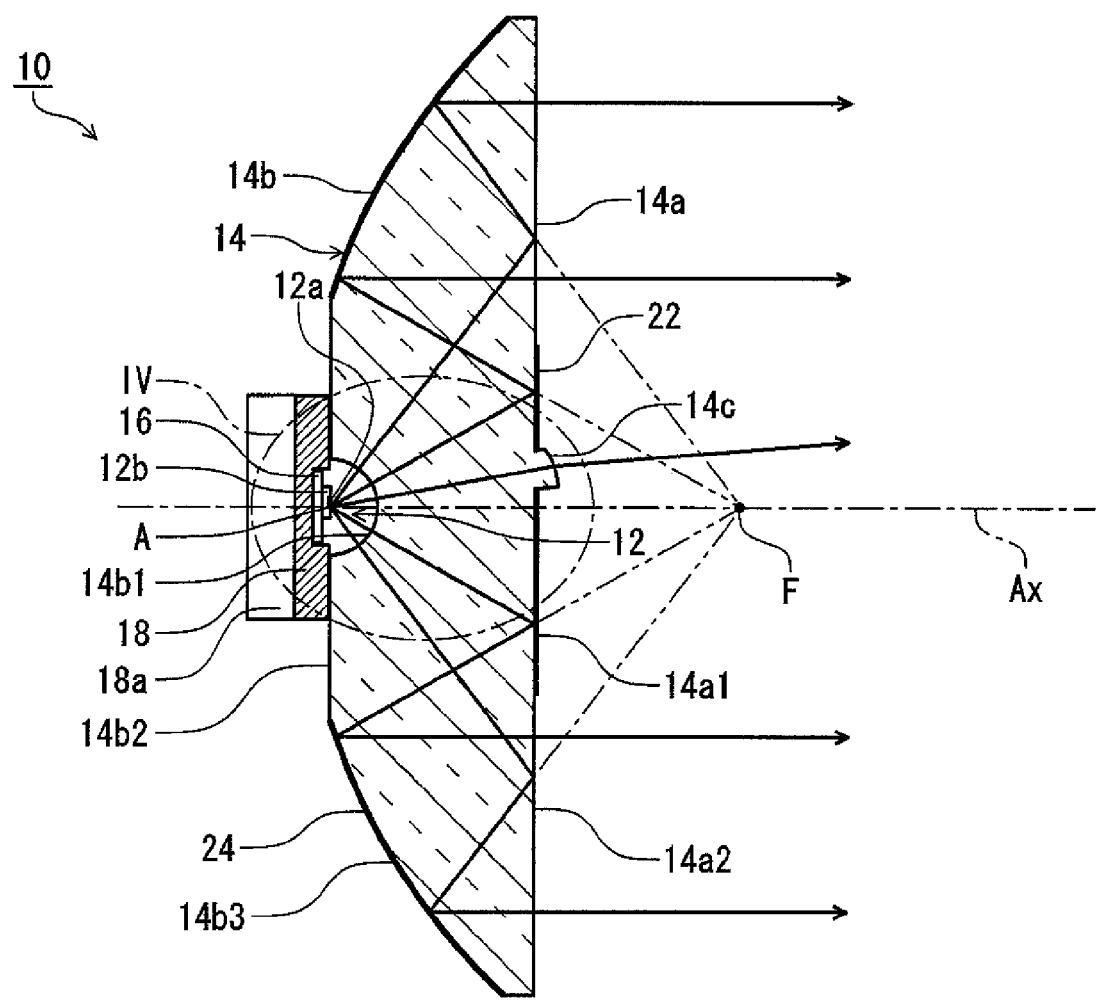
FIG. 2 is a sectional view taken along the line II-II in FIG. 1.

FIG. 1 is a front view of a vehicle lamp 10 according to the first embodiment. Additionally, FIG. 2 is a sectional view taken along the line II-II in FIG. 1.

As shown in these figures, the vehicle lamp 10 according to the first embodiment is a lamp unit that is disposed at a front end portion of a vehicle. The vehicle lamp 10 includes a light emitting element 12, a light transmissive member 14, a metallic support plate 16 and a metallic heat sink 18. The light emitting element 12 is disposed near a point A on an optical axis Ax that extends in a front-to-rear direction of the lamp and is directed to the front of the lamp. The light transmissive member 14 is disposed closer to a front side of the lamp than the light emitting element 12. The support plate 16 supports the light emitting element 12. The heat sink 18 is fixed to a rear surface of the support plate 16.

Figure 5:
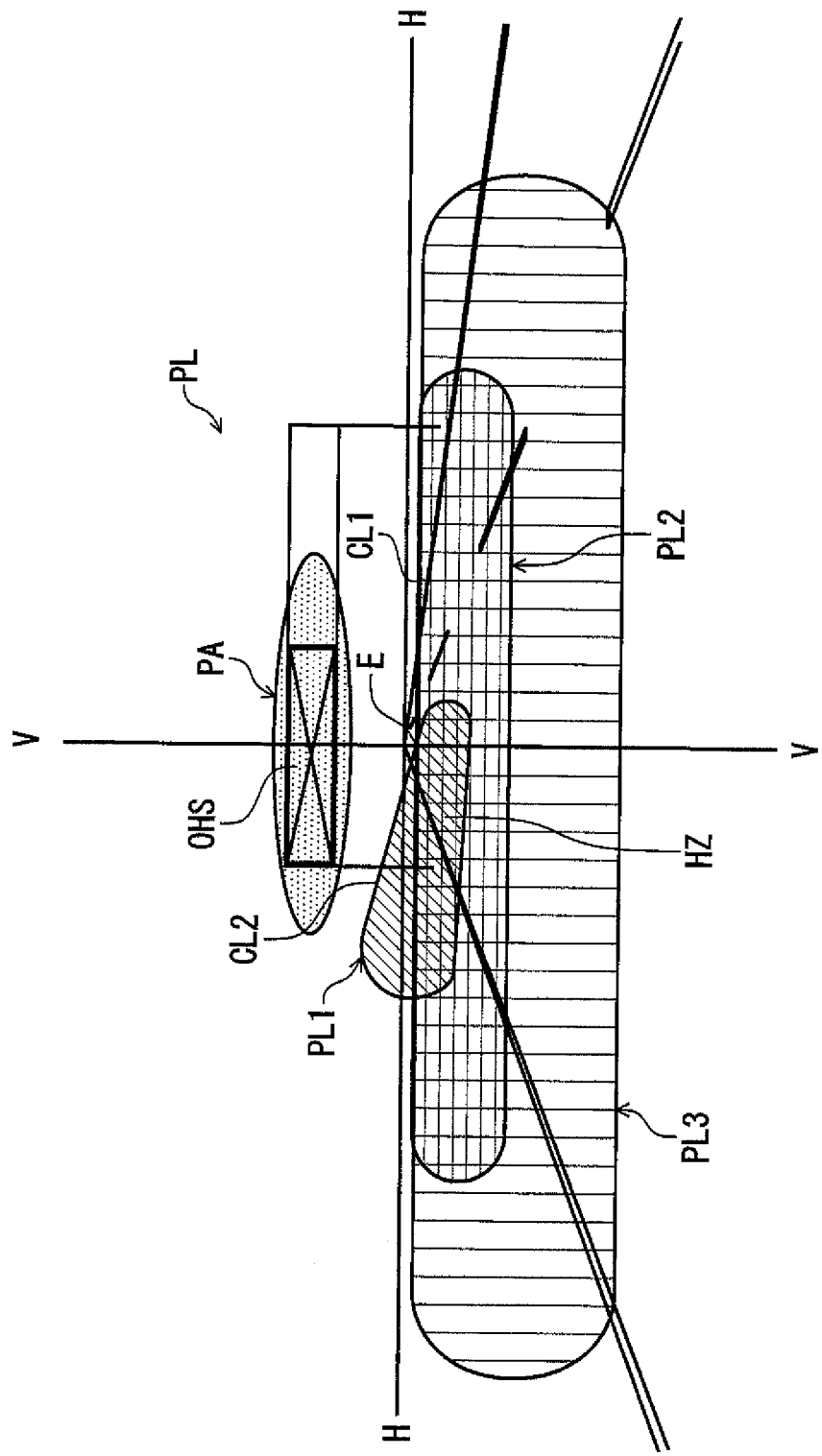
FIG. 5 is a diagram showing in a perspective fashion a low beam light distribution pattern that is formed by light emitted forwards from the vehicle lamp on an imaginary vertical screen placed 25 meters ahead of the lamp.

This vehicle lamp 10 is configured so that light emitted from the light emitting element 12 is caused to enter the light transmissive member 14 in such a manner that the light is internally reflected on a front surface 14a of the light transmissive member 14 and is then internally reflected again on a rear surface 14b of the light transmissive member 14 for emission from the front surface 14a of the light transmissive member 14, to thereby form a low beam light distribution pattern PL for a left-hand side traffic as shown in FIG. 5.

The light emitting element 12 is a white light emitting diode and includes four light emitting chips 12a that are aligned into a horizontal row so as to form a horizontally rectangular shape and a substrate 12b which supports these light emitting chips 12a.

The four light emitting chips 12a are disposed so as to stick substantially close to each other, and front surfaces thereof are covered with a film in a sealed fashion. Thus, a horizontally elongated rectangular light emitting surface is formed when looking at the lamp from the front thereof. In this case, each light emitting chip 12a has a square external shape of approximately 1×1 mm, this enabling the light emitting surface to have an external shape of approximately 1×4 mm.

The light emitting element 12 is disposed so that a lower edge of the light emitting surface is situated on a horizontal line that intersects the optical axis Ax at right angles at the point A and an end point lying on a subject vehicle's lane side (a right-hand side when looking at the lamp from the front thereof) on the lower edge is situated closer to the subject vehicle's lane side than the optical axis Ax and near the optical axis Ax (specifically speaking, for example, in a position that is spaced approximately 0.3 to 1.0 mm away from the optical axis Ax).

Figure 3:
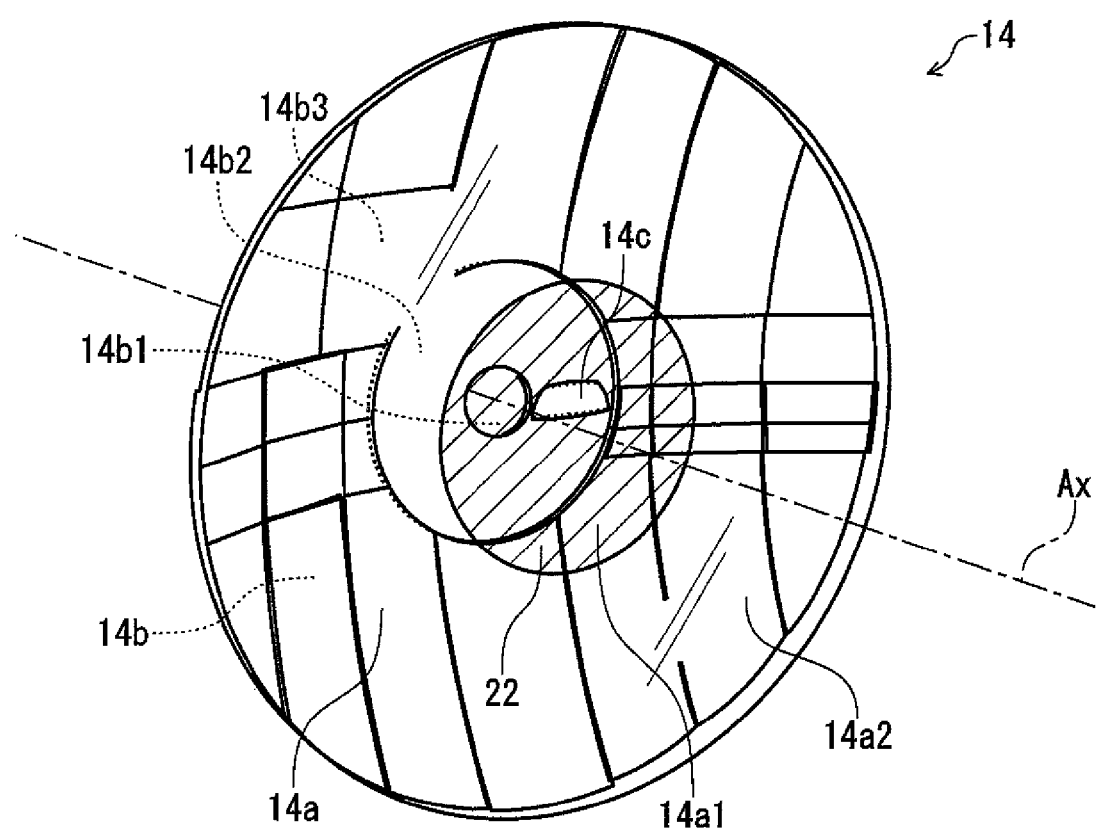
FIG. 3 is a perspective view showing a light transmissive member of the vehicle lamp.

FIG. 3 is a perspective view showing the light transmissive member 14.

As shown in the same figure, the light transmissive member 14 is formed of a transparent molded product formed from a synthetic resin such as an acrylic resin and has a circular external shape when looking at the lamp from the front thereof. In this case, an outside diameter of this light transmissive member 14 is set to a value of the order of 100 mm in diameter.

The front surface 14a of the light transmissive member 14 is formed into a flat plane that intersects the optical axis Ax at right angles. A reflecting treatment is applied to a central area 14a1 of the front surface 14a through aluminum deposition, forming a reflecting film 22.

The central area 14a1 is a circular area defined about the optical axis Ax. An outer circumferential edge of the central area 14a1 is set to lie near a position where an incident angle of light that is emitted from the light emitting element 12 (to be precise, light from the point A) and which reaches the front surface 14a of the light transmissive member 14 becomes a critical angle. By adopting this configuration, light that is emitted from the light emitting element 12 and which reaches the front surface 14a of the light transmissive member 14 is internally reflected on the reflecting surface to which the reflecting treatment is applied in the central area 14a1, while in a peripheral area 14a2 that lies further circumferentially outwards than the central area 14a1, light is internally reflected virtue of total reflection.

On the other hand, the rear surface 14b of the light transmissive member 14 is made up of a light entering area 14b1, a flat area 14b2 and an annular area 14b3.

The light entering area 14b1 is an area that is situated near the optical axis Ax and is formed so as to surround the point A in a semi-spherical fashion from the front side of the lamp, whereby light emitted from the point A is allowed to enter the light transmissive member 14 without any refraction.

The flat area 14b2 is an area that surrounds the light entering area 14b1 in an annular fashion while lying so as to be contiguous with an outer circumferential side of the light entering area 14b1. This flat area 14b2 is formed by a flat plane that intersects the optical axis Ax at right angles. The heat sink 18 is fixedly supported on the light transmissive member 14 at the flat area 14b2. This heat sink 18 includes a plurality of heat dissipating fins 18a which are formed on a rear surface thereof.

The annular area 14b3 is an area that surrounds the flat area 14b2 in an annular fashion while lying so as to be contiguous with an outer circumferential side of the flat area 14b2. The annular area 14b3 is made up of a plurality of curved planes. In this case, each of the plurality of curved planes is formed based on as a reference plane a paraboloidal plane that has its focal point F in a position that is symmetric with the point A with respect to the front surface 14a of the light transmissive member 14 and is defined about the optical axis Ax as its own axis.

A reflecting treatment is applied to the annular area 14b3 through aluminum deposition, whereby a reflecting film 24 is formed. Then, light that is emitted from the light emitting element 12 and which is internally reflected on the front surface 14a of the light transmissive member 14 is internally reflected again on this annular area 14b3.

The plurality of curved planes that make up the annular area 14b3 are classified into a reflecting zone Z1 that is situated above and to the right of the optical axis Ax (in other words, above and to the left of the optical axis Ax when looking at the lamp from the front thereof, this being true with other zones to be described below that lie obliquely above and below and directly to the left and right of the optical axis Ax), a reflecting zone Z2 that is situated directly above the optical axis Ax, a reflecting zone Z3 that is situated above and to the left of the optical axis Ax, a reflecting zone Z4 that is situated directly to the left of the optical axis Ax, a reflecting zone Z5 that is situated below and to the left of the optical axis Ax, a reflecting zone Z6 that is situated directly below the optical axis Ax, a reflecting zone Z7 that is situated below and to the right of the optical axis Ax and a reflecting area Z8 that is situated directly to the right of the optical axis Ax.

Figure 4:
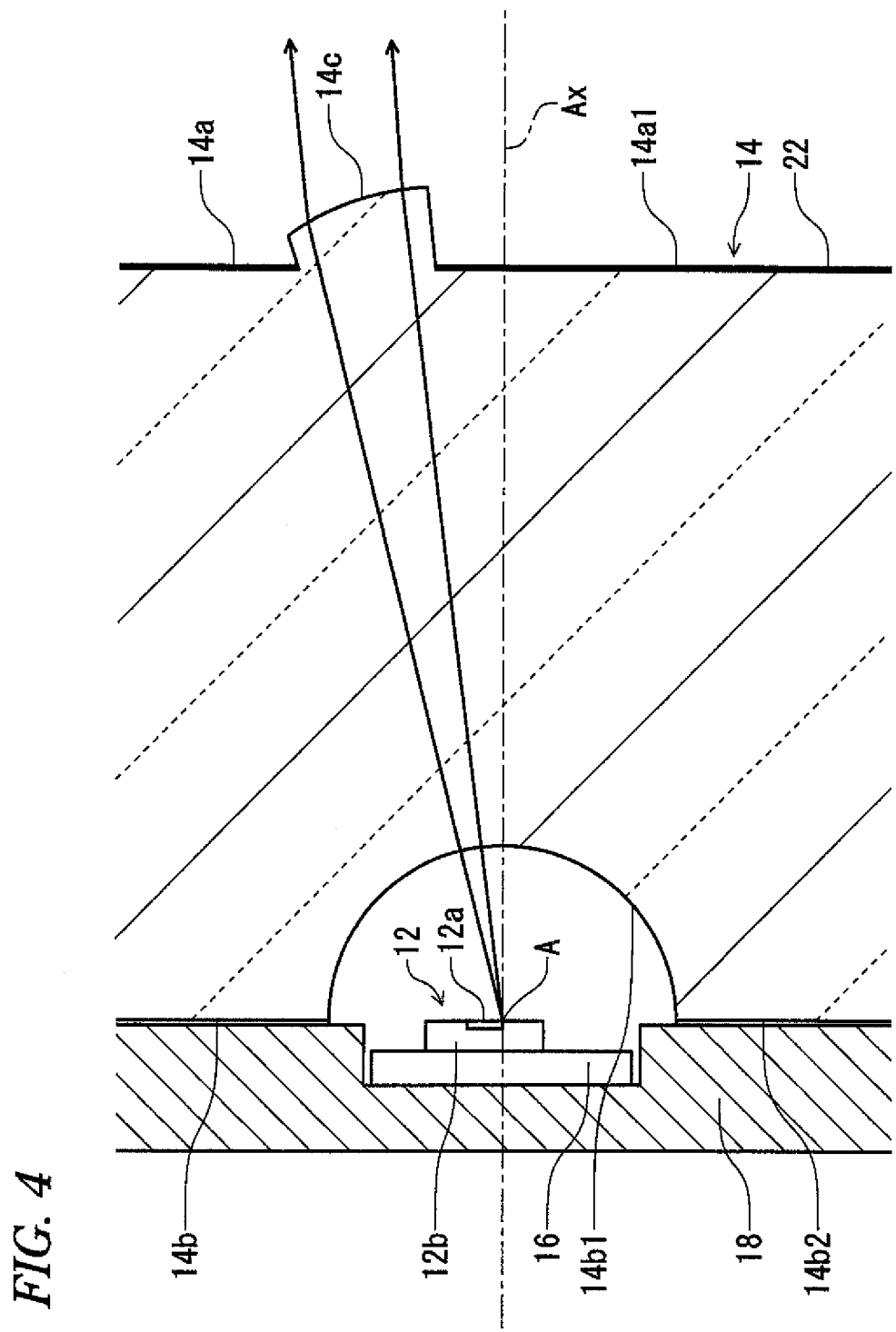
FIG. 4 is a diagram showing in detail a portion denoted as IV in FIG. 2.

FIG. 4 is a diagram showing in detail a portion denoted as IV in FIG. 2.

As shown in the same figure, a position on the central area 14a1 on the front surface 14a of the light transmissive member 14 that is situated directly above the optical axis Ax and relatively close to the optical axis Ax is formed into a non-reflecting treatment-applied portion on which the reflecting film 22 is not formed. Then, a lens portion 14c is formed on this non-reflecting treatment-applied portion, and the lens portion 14c causes part of light that is emitted from the light emitting element 12 and which enters the light transmissive member 14 to be emitted towards the front of the lamp as direct emitted light that is oriented slightly upwards.

This lens portion 14c is formed into a horizontally elongated external shape which projects from the front surface 14a and has a substantially spherical surface configuration. This lens portion 14c is configured so as to cause part of light that is emitted from the light emitting element 12 and which enters the light transmissive member 14 to be emitted as diffuse light that is slightly diffused in a substantially upward direction with respect to a vertical direction and as light that is diffused horizontally to some extent with respect to a horizontal direction.

FIG. 5 is a diagram in a perspective fashion a low beam light distribution pattern PL that is formed by light that is emitted from the vehicle lamp 10 to the front thereof on an imaginary vertical screen placed 25 m ahead of the lamp.

As shown in the same figure, this low beam light distribution pattern PL is a low beam light distribution pattern for a left-hand side traffic, as has been described before, and has horizontal and oblique cut-off lines CL1, CL2 at an upper end portion thereof. In this case, the horizontal cut-off line CL1 is formed on an oncoming vehicle's lane side with respect to a line V-V that is a vertical line passing through an H-V point which is a vanishing point in a front direction of the vehicle, and the oblique cut-off line CL2 is formed on a subject vehicle's lane side. Then, an elbow point E which is a point of intersection of both the cut-off lines CL1, CL2 is situated 0.5 to 0.6 degree below the H-V, and a hot zone HZ, which is a zone with a high luminous intensity, is formed near a subject vehicle's lane side of the elbow point E.

This low beam light distribution pattern PL is formed as a combined light distribution pattern of three light distribution patterns PL1, PL2, PL3.

The light distribution pattern PL1 is a light distribution pattern that is formed by reflection light from the reflecting zone Z1 that is situated above and to the right of the optical axis Ax. The light distribution pattern PL2 is a light distribution pattern that is formed by reflection light from the four reflecting zones Z2, Z4, Z6, Z8 which are situated directly above, directly to the left of, directly below and directly to the right of the optical axis Ax, respectively. The light distribution pattern PL3 is a light distribution pattern that is formed by reflection light from the three reflecting zones Z3, Z5, Z7 which are situated above and to the left of, below and to the left of and below and to the right of the optical axis Ax, respectively.

In this case, the light distribution pattern PL1 is formed as a small and bright light distribution pattern to form the oblique cut-off line CL2. The light distribution pattern PL2 is formed as a relatively small and relatively bright light distribution pattern to form the horizontal cut-off line CL1. The light distribution pattern PL3 is formed as a light distribution pattern to form a diffuse area which is largely diffused in a horizontal direction below the horizontal cut-off line CL1.

In this low beam light distribution pattern PL, an OHS illuminating light distribution pattern PA is formed in a position which is spaced upwardly away from both the cut-off lines CL1, CL2 to illuminate an overhead side OHS that is placed above a road surface lying ahead of the vehicle.

This OHS illuminating light distribution pattern PA is a light distribution pattern that is formed by light that is part of light that is emitted from the light emitting element 12 and which enters the light transmissive member 14 and which is emitted from the lens portion 14c towards the front of the lamp as direct emitted light that is oriented upwards. This OHS illuminating light distribution pattern PA is formed as a horizontally elongated and dimly lit light distribution pattern that spreads horizontally about the line V-V Next, the function and advantage of the first embodiment will be described.

The vehicle lamp 10 according to the first embodiment is configured so that light emitted from the light emitting element 12 that is disposed to is directed to the front of the lamp is caused to enter the light transmissive member 14 that is disposed ahead of the light emitting element 12 in such a manner that the light is internally reflected on the front surface 14a of the light transmissive member 14 and is then internally reflected again on the rear surface 14b thereof for emission from the front surface 14a of the light transmissive member 14. Additionally, the front surface 14a of the light transmissive member 14 is formed into the flat plane, and the annular area 14b3 that is situated on the outer circumferential side of the light entering area 14b1 on the rear surface 14b of the light transmissive member 14 is made up of the plurality of curved planes. In addition, the reflecting treatment is applied to the annular area 14b3. Thus, the vehicle lamp 10 can be formed thin, and in addition to this, the low beam light distribution pattern PL can be formed which is a first light distribution pattern having the cut-off lines.

In addition to this, in the vehicle lamp 10 according to the first embodiment, the lens portion 14c is formed on the front surface 14a of the light transmissive member 14. This lens portion 14c causes part of light that is emitted from the light emitting element 12 and which enters the light transmissive member 14 to be emitted towards the front of the lamp as light that is oriented upwards so as to form the OHS illuminating light distribution pattern PA, which is a second light distribution pattern, in the position that is spaced upwardly away from the cut-off lines CL1, CL2. Thus, an overhead sign OHS that is placed above a road surface lying ahead of the vehicle can easily be illuminated.

In this way, according to the first embodiment, in the vehicle lamp 10 configured so that light from the light emitting element 12 is emitted to the front of the lamp by the light transmissive member 14 that is disposed ahead of the light emitting element 12, the vehicle lamp 10 can be formed thin, and in addition to this, it is possible to form not only the low beam light distribution pattern PL but also the OHS illuminating light distribution pattern PA in the position that is spaced upwardly away from the cut-off lines CL1, CL2 of the low beam light distribution pattern PL by light that is emitted from the vehicle lamp 10.

In the first embodiment, the lens portion 14c is formed on the front surface 14a of the light transmissive member 14. The front surface 14a is formed into the flat plane. Thus, the lens portion 14c can easily be formed with good accuracy.

In this case, in the vehicle lamp 10 according to the first embodiment, the reflecting treatment is applied to the central area 14a1 of the front surface 14a of the light transmissive member 14, and therefore, more light can be internally reflected towards the rear surface 14b of the light transmissive member 14. Then, the part of the central area 14a1 is configured as the non-reflecting treatment-applied portion, and the lens portion 14c is formed on this non-reflecting treatment-applied portion. Thus, the following function and advantage can be obtained.

Namely, in case a lens portion like the lens portion 14c is formed on the peripheral area 14a2 of the front surface 14a of the light transmissive member 14, no light is internally reflected towards the rear surface 14b of the light transmissive member 14 at the portion where the lens portion is formed, this reducing the light utilization efficiency accordingly.

On the other hand, not all the light that is emitted from the light emitting element 12 and which is internally reflected on the central area 14a1 of the front surface 14a of the light transmissive member 14 reaches the annular area 14b3 on the rear surface 14b. Light that is internally reflected on the central area 14a1 in a position lying relatively near the optical axis Ax does not reach the annular area 14b3.

In the first embodiment described above, the position on the central area 14a1 that is situated relatively near the optical axis Ax is configured as the non-reflecting treatment-applied portion, and the lens portion 14c is formed at this non-reflecting treatment-applied portion. Thus, it is possible to obtain direct emitted light that is oriented upwards to form the OHS illuminating light distribution pattern PA without reducing the light that is internally reflected towards the annular area 14b3.

In the first embodiment described above, while the light emitting element 12 is described as having the horizontally elongated rectangular light emitting surface, it is, of course, possible to configure the light emitting element 12 as a light emitting element having a light emitting surface of any other shapes than the horizontally elongated rectangular shape.

In the first embodiment described above, while the lens portion 14c is described as being integral with the light transmissive member 14, a configuration may be adopted in which only the lens portion 14c is configured as a separate member, which is then fixed to the front surface 14a of the light transmissive member 14 with an adhesive, for example.

In the first embodiment above, the vehicle lamp 10 is described as being configured to form the first light distribution pattern as the low beam light distribution pattern PL for the left-hand side traffic. However, even in the event that a vehicle lamp is configured to form a first light distribution pattern as a low beam light distribution pattern for the right-hand side traffic or a light distribution pattern for a fog lamp, by adopting a similar configuration to that of the first embodiment described above, a similar function and advantage to those of the first embodiment can be obtained.

In the first embodiment described above, while the vehicle lamp 10 is described as being configured to form the OHS illuminating light distribution pattern PA as the second light distribution pattern, the vehicle lamp 10 may be configured to form any other light distribution patterns than the OHS illuminating light distribution pattern PA as the second light distribution pattern.

Next, modified examples of the first embodiment will be described.

First, a first modified example of the first embodiment will be described.

Figure 6:
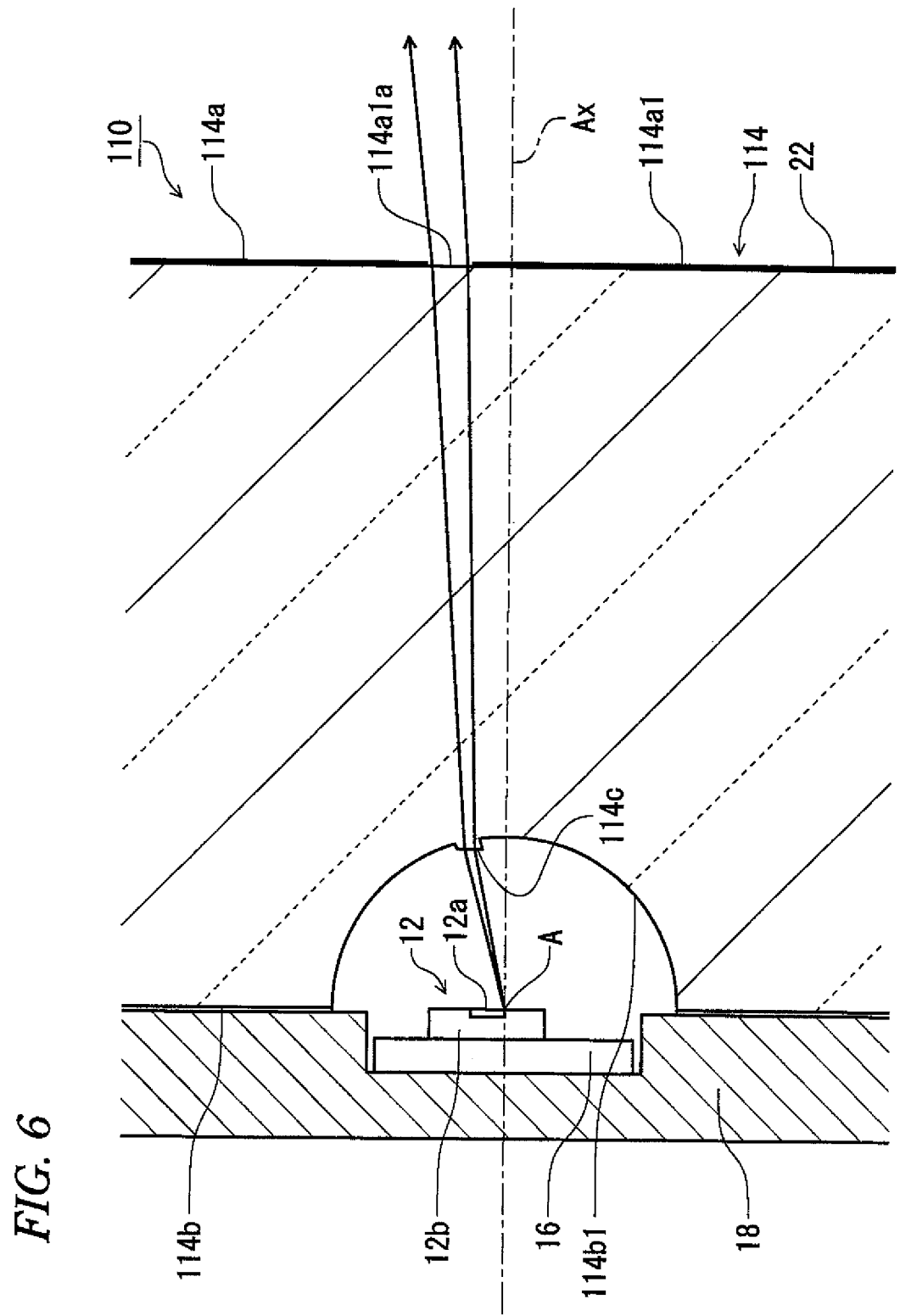
FIG. 6 is a diagram similar to FIG. 4 which shows a first modified example of the first embodiment.
Figure 7:
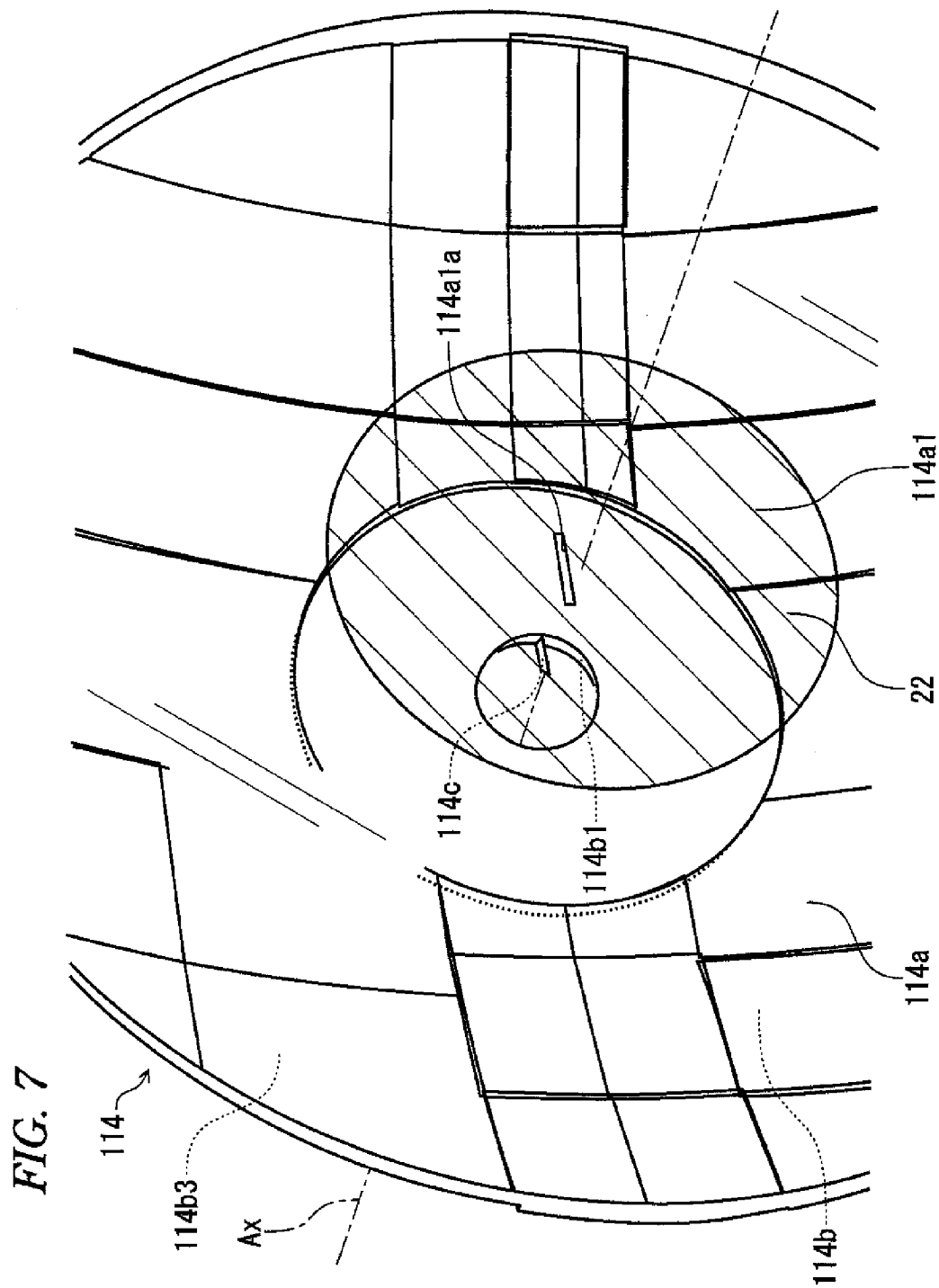
FIG. 7 is a perspective view showing a main part of a light transmissive member of the first modified example.

FIG. 6 is a diagram similar to FIG. 4 which shows a vehicle lamp 110 according to the first modified example. Additionally, FIG. 7 is a perspective view showing a main part of a light transmissive member 114 of the vehicle lamp 110.

As shown in these figures, the vehicle lamp 110 differs from the first embodiment with respect to a partial configuration of the light transmissive member 114.

Namely, in the first modified example, although a basic configuration of the light transmissive member 114 is similar to that of the light transmissive member 14 of the first embodiment, a configuration of the light transmissive member 114 to form the OHS illuminating light distribution pattern PA differs from that of the light transmissive member 14 of the first embodiment.

Specifically speaking, in the light transmissive member 114 of the first modified example, a lens portion 114c is formed on a light entering area 114b1 of a rear surface 114b thereof. Additionally, a portion on a central area 114a1 on a front surface 114a of the light transmissive member 114 at which light emitted from a light emitting element 12 and which enters from the lens portion 114c arrives is configured as a non-reflecting treatment-applied portion 114a1a where a reflecting film 22 is not formed.

In this case, the lens portion 114c is formed in a position on the light entering area 114b1 that lies above and near an optical axis Ax so as to have a horizontally elongated external shape which projects from a semi-spherical surface to the rear. Additionally, this lens portion 114c is configured so as to cause light from the light emitting element 12 to enter the light transmissive member 114 as diffuse light that is slightly diffused in a substantially upward direction with respect to a vertical direction and as light that is diffused horizontally to some extent with respect to a horizontal direction.

On the other hand, the non-reflecting treatment-applied portion 114a1a is formed into a horizontally elongated rectangular shape in a position lying above and near the optical axis Ax so as to cause part of light that is emitted from the light emitting element 12 and which enters the light transmissive member 114 at the lens portion 114c to be emitted towards the front of the lamp as direct emitted light that is oriented slightly upwards.

By adopting the configuration of the first modified example, the same function and advantage as those obtained by the first embodiment can also be obtained without providing a projecting portion on the light transmissive member 114.

In this case, in the first modified example, the non-reflecting treatment-applied portion 114a1a is formed in the position lying above and near the optical axis Ax (that is, the position where internally reflected light reflected at the portion where the non-reflecting treatment-applied portion is formed is not allowed to reach an annular area 114b3 even in the event that a reflecting treatment is applied to the portion where the non-reflecting treatment-applied portion is formed). Therefore, it is possible to obtain direct emitted light that is oriented upwardly so as to form the OHS illuminating light distribution pattern PA without reducing light that is internally reflected towards the annular area 114b3.

Next, a second modified example of the first embodiment will be described.

Figure 8:
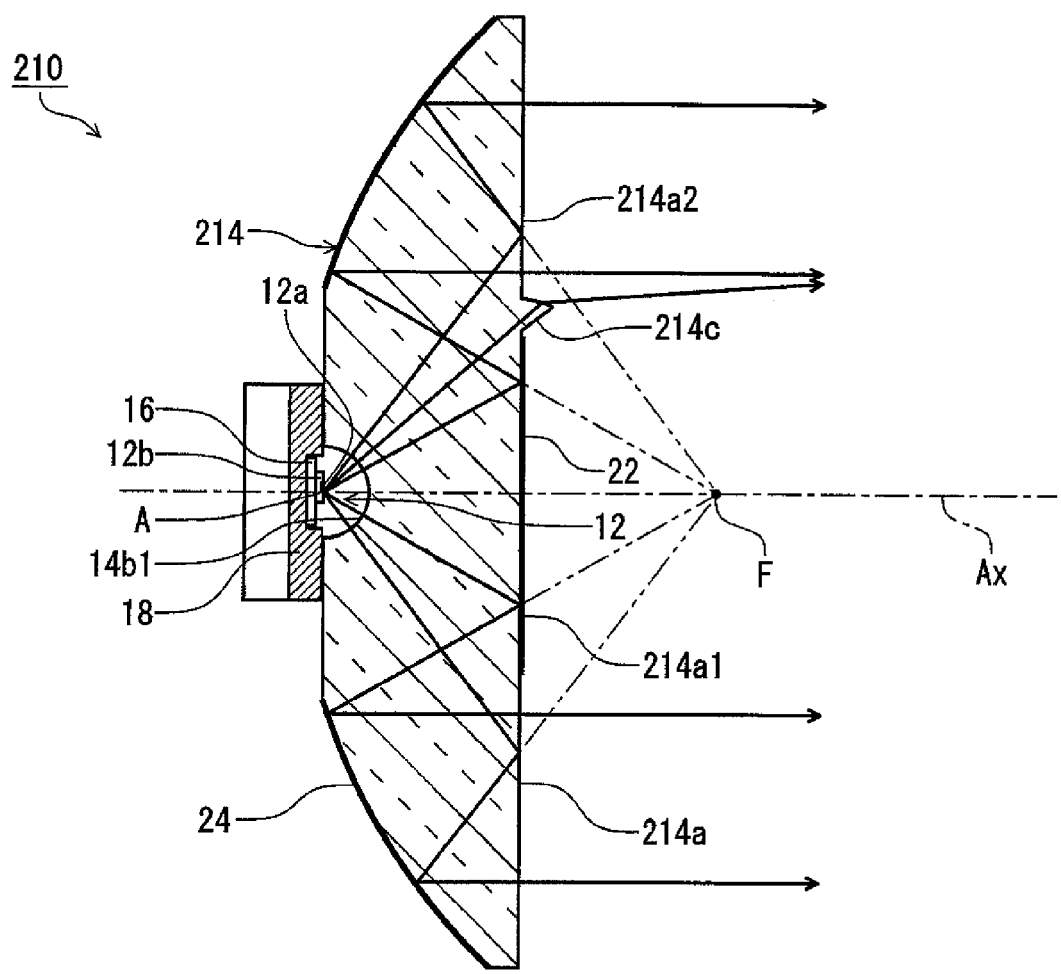
FIG. 8 is a diagram similar to FIG. 2 which shows a second modified example of the first embodiment.

FIG. 8 is a diagram similar to FIG. 2 which shows a vehicle lamp 210 according the second modified example.

As shown in the same figure, the vehicle lamp 210 differs from the vehicle lamp 10 of the first embodiment with respect to a partial configuration of a light transmissive member 214 thereof.

Namely, also in the second modified example, as with the first embodiment, a lens portion 214c is formed on a front surface 214a of the light transmissive member 214. However, a position where to form the lens portion 214c is not set in a central area 214a1 on the front surface 214a but is set in a position of a peripheral area 214a2 of the front surface 214a which lies above and near the central area 214a1.

As with the lens portion 14c of the first embodiment, this lens portion 214c is configured so as to cause part of light from a light emitting element 12 to enter the light transmissive member 214 as diffuse light that is slightly diffused in a substantially upward direction with respect to a vertical direction and as light that is diffused horizontally to some extent with respect to a horizontal direction.

By adopting the configuration of the second modified example, a reflecting film 22 can easily be formed on the central area 214a1 of the front surface 214a of the light transmissive member 214.

Next, a second embodiment of the invention will be described.

Figure 9:
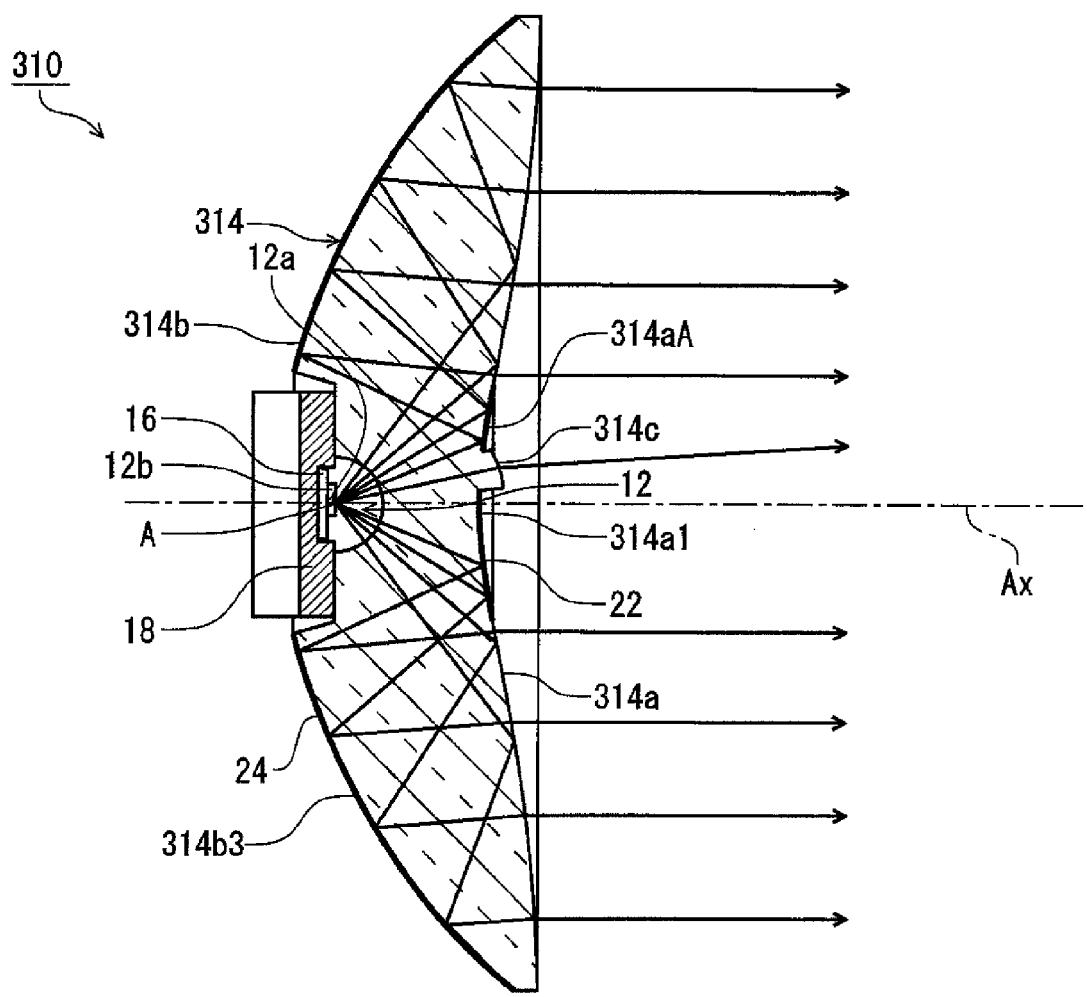
FIG. 9 is a diagram similar to FIG. 2 which shows a vehicle lamp according to a second embodiment of the invention.

FIG. 9 is a front view of a vehicle lamp 310 according to the second embodiment.

As shown in the same figure, the vehicle lamp 310 according to the second embodiment is similar to the vehicle lamp 10 according to the first embodiment with respect to a basic configuration. However, surface configurations of a front surface 314a and a rear surface 314b of a light transmissive member 314 differ from those of the light transmissive member 14 of the vehicle lamp 10 of the first embodiment.

Namely, in the vehicle lamp 310 according to the second embodiment, the front surface 314a of the light transmissive member 314 is formed into a paraboloidal plane having a concavely curved surface portion 314a in a center thereof. In this case, this paraboloidal plane is formed by a smooth curved surface generated by the rotation of a parabola about an optical axis Ax.

Then, also in this vehicle lamp 310, light emitted from a light emitting element 12 is caused to enter the light transmissive member 314 in such a manner that the light is internally reflected on the front surface 314a of the light transmissive member 314 and is then internally reflected again on the rear surface 314b of the light transmissive member 314 for emission from the front surface 314a of the light transmissive member 314 to thereby form a low beam light distribution pattern PL for the left-hand side traffic as shown in FIG. 5.

To realize this, also in the vehicle lamp 310, as with the vehicle lamp 10, an annular area 314b3, on which a reflecting film 24 is formed, of the rear surface 314b of the light transmissive member 314 is made up of a plurality of curved planes. In this case, each of the plurality of curved planes is formed based on as a reference plane a paraboloidal plane whose configuration is set so that light that comes from a point A on the light emitting element 12 and which is internally reflected on the front surface 314a of the light transmissive member 314 is internally reflected again and is then emitted from the front surface 314a in a direction parallel to the optical axis Ax.

In addition, also in the vehicle lamp 310, as with the vehicle lamp 10, a reflecting treatment is applied to a central area 314a1 on the front surface 314a of the light transmissive member 314 (that is, a central portion of a concavely curved surface portion 314aA), whereby a reflecting film 22 is formed.

As with the central area 14a1 of the vehicle lamp 10, this central area 314a1 is a circular area defined about the optical axis Ax. An outer circumferential edge of the central area 314a1 is set to lie near a position where an incident angle of light that is emitted from the light emitting element 12 (to be precise, light from the point A) and which reaches the front surface 314a of the light transmissive member 314 becomes a critical angle. In this case, the front surface 314a of the light transmissive member 314 is formed into the paraboloidal plane having the concavely curved surface portion 314aA in the center thereof, and therefore, an outer circumferential edge of the central area 314a1 of the light transmissive member 314 is situated closer to the optical axis Ax than that of the central area 14a1 of the vehicle lamp 10.

In addition, since the outer circumferential edge of the central area 314a1 on the front surface 314a of the light transmissive member 314 is situated closer to the optical axis Ax, reflected light reflected from the annular area 314b3 on the rear surface 314b of the light transmissive member 314 is made difficult to enter the central area 314a1 accordingly. Because of this, an inner circumferential edge of the annular area 314b3 is also situated closer to the optical axis Ax than that of the annular area 14b3 of the vehicle lamp 10.

Also, in the light transmissive member 314 of the second embodiment, a lens portion 314c is formed which is similar to the lens portion 14c of the light transmissive member 14 of the first embodiment of the invention.

Namely, the position on the central area 314a1 of the front surface 314a of the light transmissive member 314 which lies directly above the optical axis Ax and near the optical axis Ax is formed as a non-reflecting treatment-applied portion where a reflecting film 22 is not formed. Then, the lens portion 314c is formed on this non-reflecting treatment-applied portion, which lens portion 314c causes part of light that is emitted from the light emitting element 12 and which enters the light transmissive member 314 to be emitted towards the front of the lamp as direct emitted light that is oriented slightly upwards.

This lens portion 314c is formed into a horizontally elongated external shape which projects from the front surface 314a and has a substantially spherical surface configuration. Then, this lens portion 314c is configured so as to cause part of light that is emitted from the light emitting element 12 and which enters the light transmissive member 314 to be emitted as diffuse light that is slightly diffused in a substantially upward direction with respect to a vertical direction and as light that is diffused horizontally to some extent with respect to a horizontal direction.

Also, in the case of the configuration of the second embodiment being adopted, the same function and advantage as those obtained by the first embodiment of the invention can be obtained.

In particular, in the second embodiment, since the front surface 314a of the light transmissive member 314 is formed into the paraboloidal plane having the concavely curved surface portion 314aA in the center thereof, an area on the front surface 314a where a total reflection occurs is wider than where the front surface is formed into the flat plane. Because of this, the size of the central area 314a1 to which the reflecting treatment is applied can be reduced. Consequently, the range of the annular area 314b3 on the rear surface 314b of the light transmissive member 314 to which the reflecting treatment is applied can be spread accordingly, thereby making it possible to realize an effective use of light.

In addition, in this second embodiment, the lens portion 314c is formed on the front surface 314a of the light transmissive member 314, and this lens portion 314c is formed in the position that lies relatively near the optical axis Ax. Additionally, the front surface 314a of the light transmissive member 314 is formed into the paraboloidal plane having the concavely curved surface portion 314aA in the center thereof. Thus, although the lens portion 314c is formed on the front surface 314a, the forward projection of the light transmissive member 314 can be suppressed, whereby the vehicle lamp 310 can be maintained thin.

Note that various variations like those described at the end of the description of the first embodiment of the invention can also be added to this second embodiment.

Next, a modified example of the second embodiment of the invention will be described.

Figure 10:
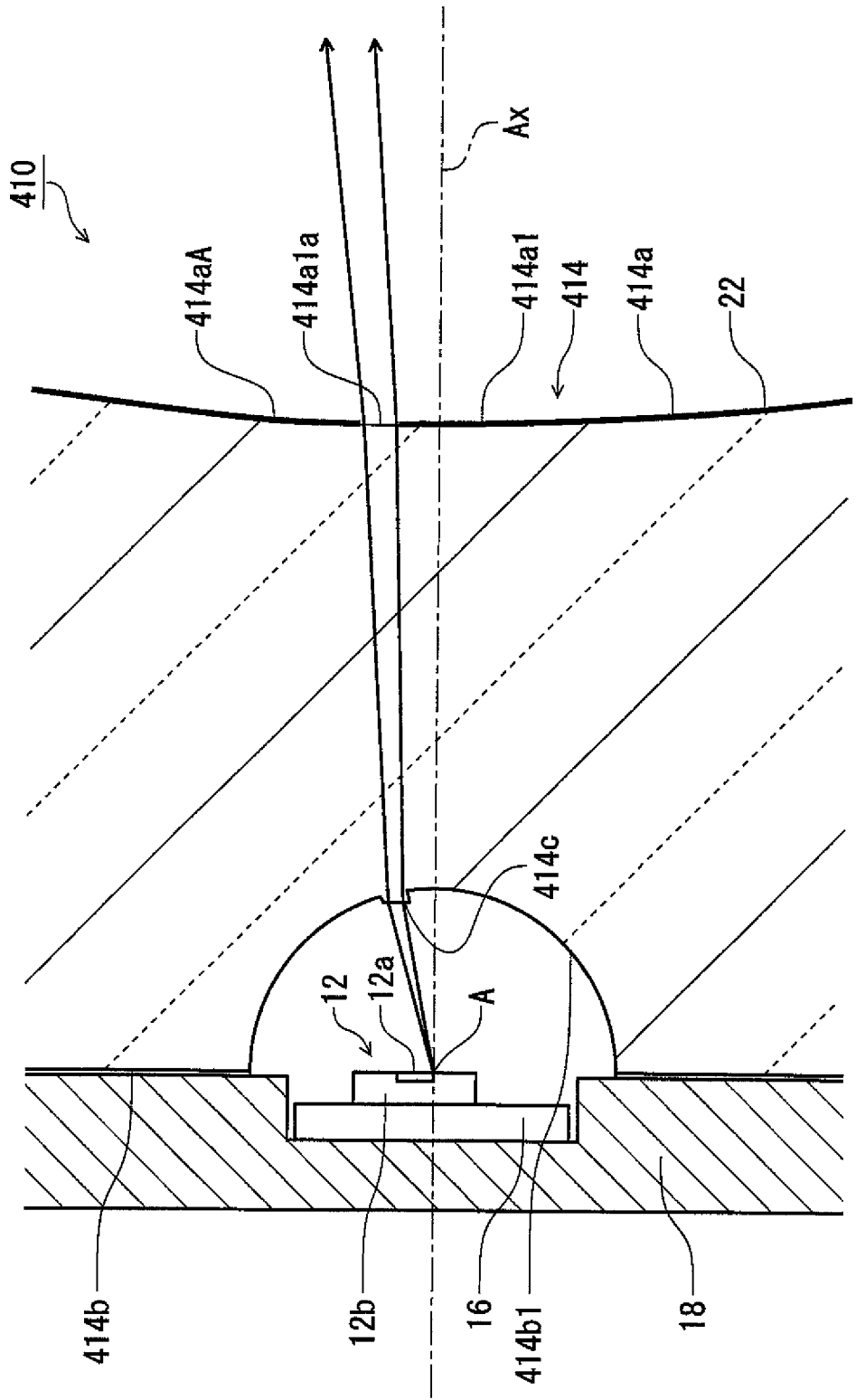
FIG. 10 is a diagram similar to FIG. 6 which shows a vehicle lamp according to a first modified example of the second embodiment of the invention.

FIG. 10 is a diagram similar to FIG. 6 which shows a vehicle lamp 410 according to this modified example.

As shown in the same figure, this vehicle lamp 410 differs from the second embodiment with respect to a partial configuration of a light transmissive member 414.

In this modified example, a basic configuration of the light transmissive member 410 is similar to that of the light transmissive member 314 of the second embodiment, however, a configuration to form an OHS illuminating light distribution pattern PA differs from that of the second embodiment.

Specifically, in the light transmissive member 414 of this modified example, although a front surface 414a is formed into a paraboloidal plane having a concavely curved surface portion 414aA in a center thereof, a lens portion 414c is formed on a light entering area 414b1 of a rear surface 414b. Additionally, a portion on a central area 414a1 of the front surface 414a at which light that is emitted from a light emitting element 12 and which enters from the lens portion 414c arrives is configured as a non-reflecting treatment-applied portion 424a1a where a reflecting film 22 is not formed.

In this case, the lens portion 414c is formed in a position on the light entering area 414b1 that lies above and near an optical axis Ax so as to have a horizontally elongated external shape which projects from a semi-spherical surface to the rear. Additionally, this lens portion 414c is configured so as to cause light from the light emitting element 12 to enter the light transmissive member 414 as diffuse light that is slightly diffused in a substantially upward direction with respect to a vertical direction and as light that is diffused horizontally to some extent with respect to a horizontal direction.

On the other hand, the non-reflecting treatment-applied portion 414a1a is formed into a horizontally elongated rectangular shape in a position lying above and near the optical axis Ax so as to cause part of light that is emitted from the light emitting element 12 and which enters the light transmissive member 414 at the lens portion 414c to be emitted towards the front of the lamp as direct emitted light that is oriented slightly upwards.

By adopting the configuration of the first modified example, the same function and advantage as those obtained by the second embodiment can also be obtained without providing a projecting portion on the light transmissive member 414.

Next, a third embodiment of the invention will be described.

Figure 11:
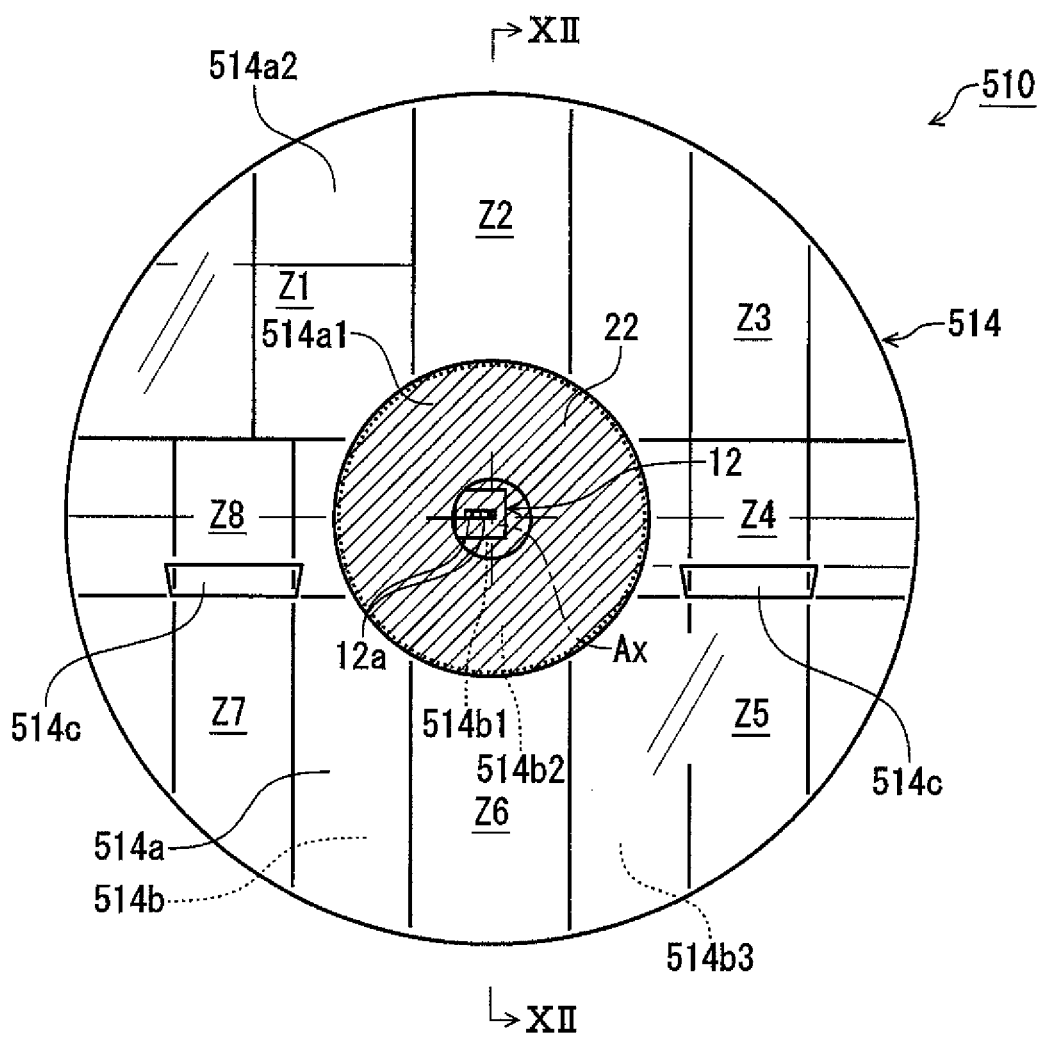
FIG. 11 is a front view of a vehicle lamp according to a third embodiment of the invention.
Figure 12:
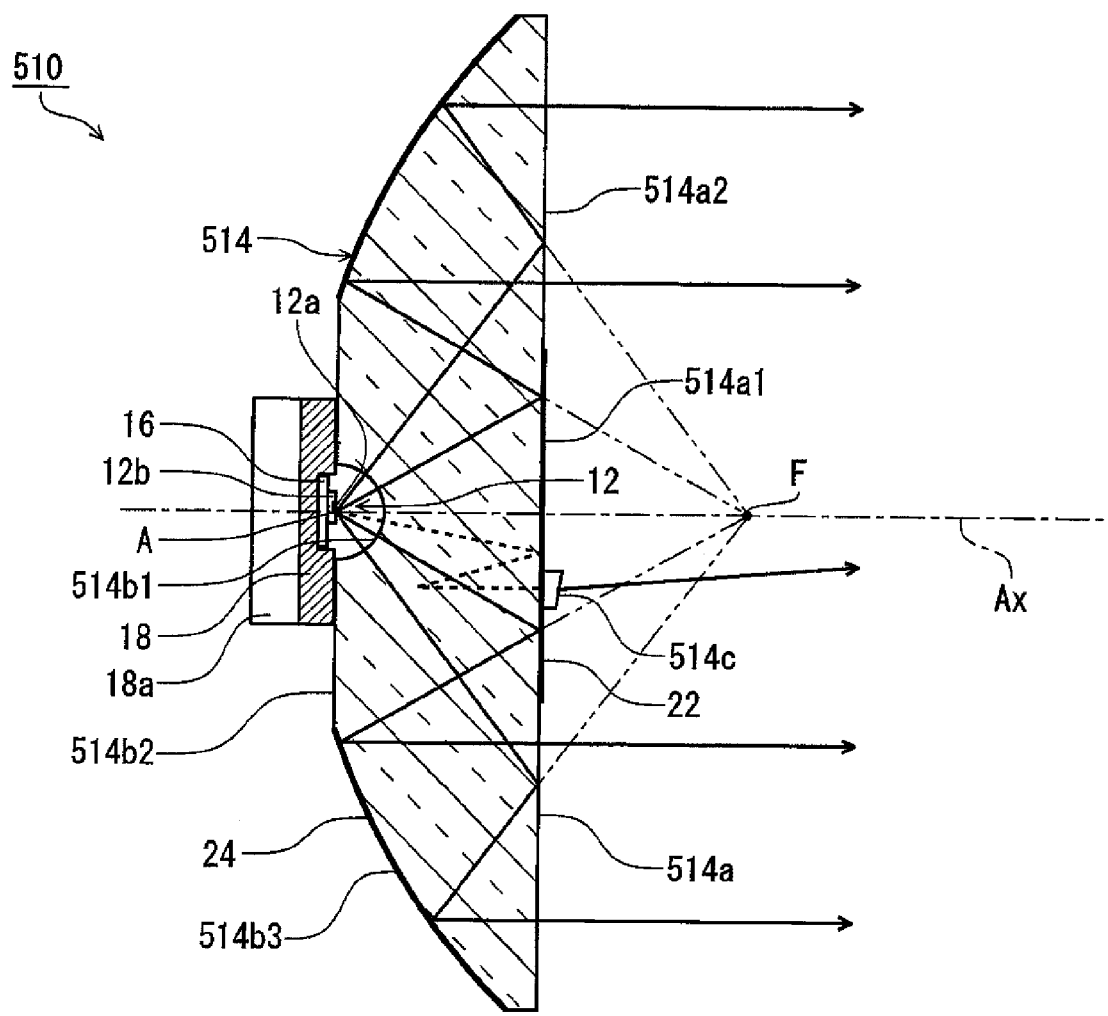
FIG. 12 is a sectional view taken along the line XII-XII in FIG. 11.
Figure 13:
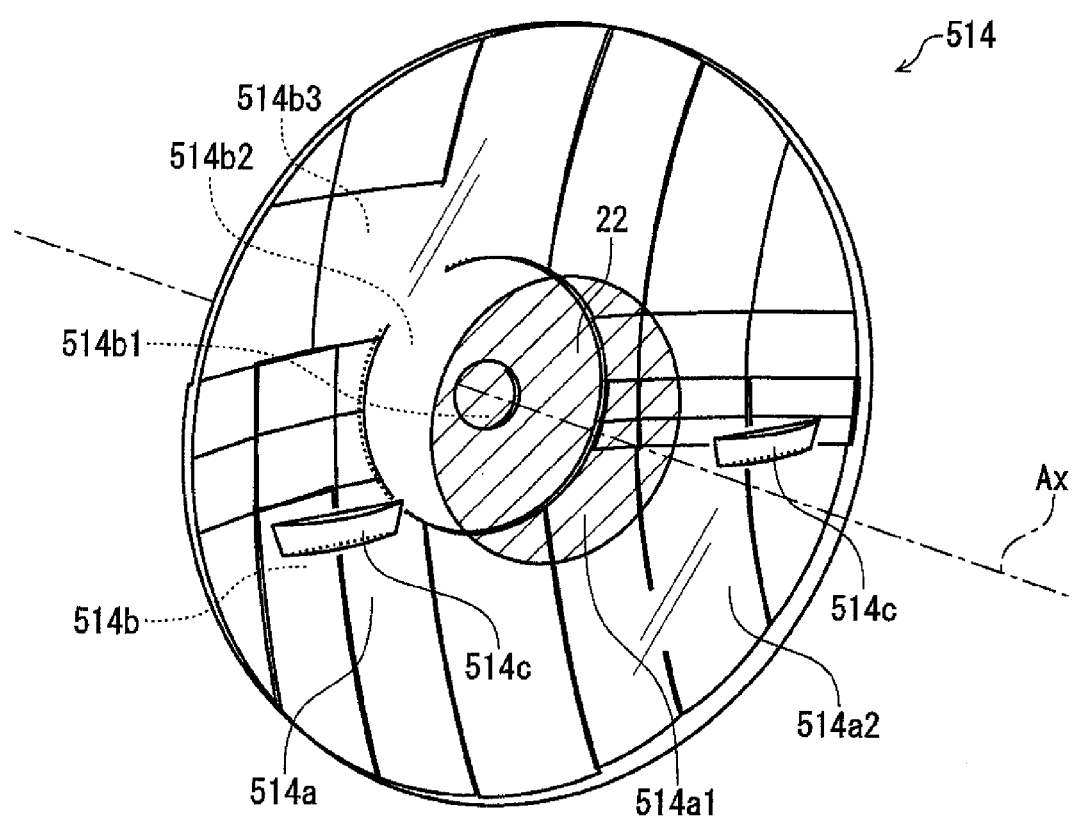
FIG. 13 is a perspective view showing a light transmissive member of the vehicle lamp.

FIG. 11 shows a front view of a vehicle lamp 510 according to the third embodiment. Additionally, FIG. 12 is a sectional view taken along the line XII-XII in FIG. 11.

As shown in these figures, although a basic configuration of the vehicle lamp 510 of the third embodiment is similar to that of the vehicle lamp 10 of the first embodiment of the invention, part of the configuration of a light transmissive member 514 differs from that of the light transmissive member 14 of the vehicle lamp 10.

Namely, in the vehicle lamp 510 of the third embodiment, a basic configuration of the light transmissive member 514 is similar to that of the light transmissive member 14 of the first embodiment of the invention, but a configuration to form an OHS illuminating light distribution pattern PA differs from that of the first embodiment of the invention.

Specifically, a pair of lens portions 514c are formed on a peripheral area 514a2 on a front surface 514a of the light transmissive member 514 in positions that lie on left- and right-hand sides of an optical axis Ax and which are spaced slightly downwards away from a horizontal plane that contains the optical axis Ax, these lens portions 514c being configured to cause light that is emitted from a light emitting element 12 and which is internally reflected again on an annular area 514b3 on the rear surface 514b of the light transmissive member 514 to be emitted towards the front of the lamp as light that is oriented slightly upwards. In this case, the pair of left and right lens portions 514c are situated forwards of lower end portions of reflecting zones Z4, Z8 on the annular area 514b3.

These lens portions 514c are each formed into a horizontally elongated external shape which projects from the front surface 514a and each have a substantially spherical surface configuration. These lens portions 514c are each configured so as to cause part of light that is emitted from the light emitting element 12 and which enters the light transmissive member 514 to be emitted as diffuse light that is slightly diffused in a substantially upward direction with respect to a vertical direction and as light that is diffused horizontally to some extent with respect to a horizontal direction.

An OHS illuminating light distribution pattern PA as shown in FIG. 5 is formed by light emitted from the pair of left and right lens portions 514c which is part of light that is emitted from the light emitting element 12 and which is internally reflected on the front surface 514a and is then internally reflected again on the annular area 514b3 on the rear surface 514b of the light transmissive member 514.

Next, the function and advantage of the third embodiment will be described.

The vehicle lamp 510 of the third embodiment is configured so that light emitted from the light emitting element 12 that is disposed to is directed to the front of the vehicle is caused to enter the light transmissive member 514 that is disposed ahead of the light emitting element 12 in such a manner that the light is internally reflected on the front surface 514a and is then reflected internally again on the rear surface 514b for emission from the front surface 514a of the light transmissive member 514. Additionally, in the light transmissive member 514, the front surface 514a is formed into the flat plane, while the annular area 514b3 that is situated on an outer circumferential side of a light entering area 514b1 on the rear surface 514b is made up of a plurality of curved planes. In addition, a reflecting treatment is applied to the annular area 514b3. Thus, the vehicle lamp 510 can be configured thin, and in addition to this, it is possible to form a low beam light distribution pattern PL as a first light distribution pattern having cut-off lines at an upper end portion thereof.

In addition to this, in the vehicle lamp 510 according to the third embodiment, the pair of left and right lens portions 514c are formed on the peripheral area 514a2 on the front surface 514a of the light transmissive member 514, and these lens portions 514c are configured to cause part of light that is emitted from the light emitting element 12 and which is internally reflected again on the rear surface 514b of the light transmissive member 514 to be emitted towards the front as light that is oriented upwards so as to form the OHS illuminating light distribution pattern PA as a second light distribution pattern in a position that is spaced upwards away from the cut-off lines CL1, CL2 of the low beam light distribution pattern PL. Thus, an OHS placed above a road surface lying ahead of the vehicle can easily be illuminated.

In this way, according to the third embodiment, in the vehicle lamp 510 configured so that light from the light emitting element 12 is emitted to the front of the lamp by the light transmissive member 514 that is disposed ahead of the light emitting element 12, the vehicle lamp 510 can be configured thin, and in addition to this, it is possible to form not only the low beam light distribution pattern PL but also the OHS illuminating light distribution pattern PA in the position that is spaced upwards away from the cut-off lines CL1, CL2 of the low beam light distribution pattern PL by light emitted from the vehicle lamp 510.

In this third embodiment, the pair of left and right lens portions 514c are formed on the front surface 514a of the light transmissive member 514. Since the front surface 514a is formed into the flat plane, these lens portions 514c can easily be formed with good accuracy.

In this case, in the vehicle lamp 510 according to the third embodiment, the light emitting element 12 has a horizontally elongated substantially rectangular light emitting surface, and the pair of left and right lens portions 514c are situated ahead of the reflecting zones Z4, Z8 which are situated on the left- and right-hand sides of the optical axis Ax. Thus, the following function and advantage can be obtained.

Namely, when the light emitting element 12 has the horizontally elongated substantially rectangular light emitting surface, in light source images that are formed by light that is internally reflected again on the annular area 514b3 of the rear surface 514b of the light transmissive member 514 and which is then emitted from the front surface 514a thereof, a light source image that is formed by light emitted from a cross-shaped area that extends in a belt-like fashion vertically and horizontally about the light emitting element 12 (to be more precise, the optical axis Ax) when looking at the lamp from the front thereof is maintained to a shape that resembles a horizontally elongated substantially rectangular shape.

In this third embodiment, light that is internally reflected again on four reflecting zones Z2, Z4, Z6, Z8 that extend vertically and horizontally on the annular area 514b3 on the rear surface 514b of the light transmissive member 514 is emitted from the cross-shaped area. The pair of left and right lens portions 514c are situated forwards of the pair of left and right reflecting zones Z4, Z8. Thus, the OHS illuminating light distribution pattern PA can easily be formed as a horizontally elongated light distribution pattern that is suitable for illumination of an overhead sign OHS.

In the third embodiment described above, while the pair of left and right lens portions 514c are described as being formed at the lower end portions of the pair of left and right reflecting zones Z4, Z8 on the peripheral area 514a2 on the front surface 514a of the light transmissive member 514, even in the event that a configuration is adopted in which the lens portions 514c are formed at other portions on the reflecting zones Z4, Z8 or at the reflecting zones Z2, Z6 on the front surface 514a of the light transmissive member 514, substantially the same function and advantage as those obtained by the third embodiment can also be obtained.

In the third embodiment described above, while the pair of left and right lens portions 514c are described as being formed on the peripheral area 514a2 on the front surface 514a of the light transmissive member 514, a configuration may be adopted in which only either of them is formed on the front surface 514a.

In the third embodiment described above, while the light emitting element 12 is described as having the horizontally elongated light emitting surface, it is, of course, possible to adopt a configuration in which the light emitting element 12 has a light emitting surface of any of other shapes than the horizontally elongated rectangular shape.

In the third embodiment described above, while the vehicle lamp 510 is described as being configured to form the low beam light distribution pattern PL for the left-hand side traffic as the first light distribution pattern, even in the event that the vehicle lamp 510 is configured to form a low beam light distribution pattern for the right-hand side traffic or a fog lamp light distribution pattern, by adopting the same configuration as that of the third embodiment, the same function and advantage as those obtained by the third embodiment can also be obtained.

In the third embodiment, while the vehicle lamp 510 is described as being configured to form the OHS illuminating light distribution pattern PA as the second light distribution pattern, the vehicle lamp 510 can be configured to form any other light distribution patterns than the OHS illuminating light distribution pattern PA.

Next, modified examples of the third embodiment will be described.

Firstly, a first modified example of the third embodiment will be described.

Figure 14:
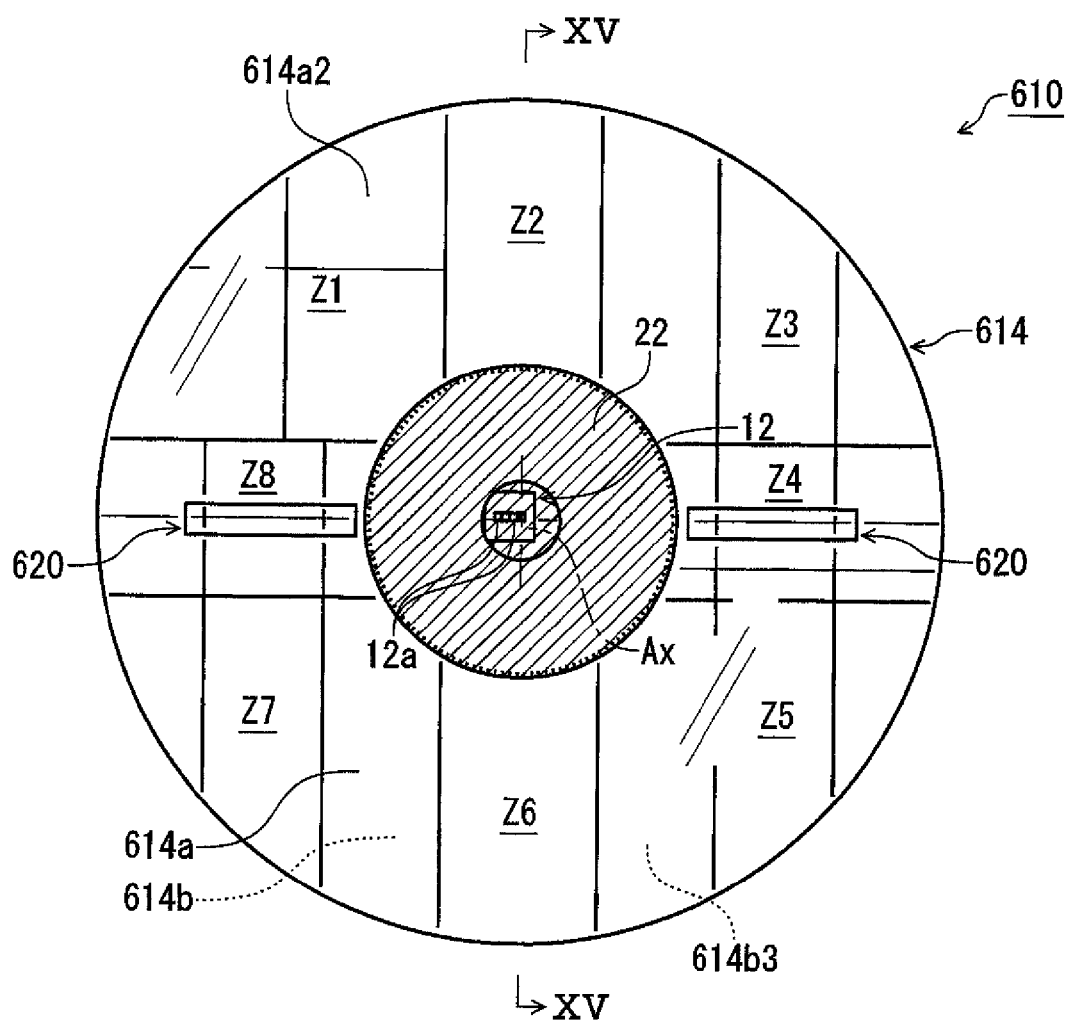
FIG. 14 is a diagram similar to FIG. 11 which shows a first modified example of the third embodiment.
Figure 15:
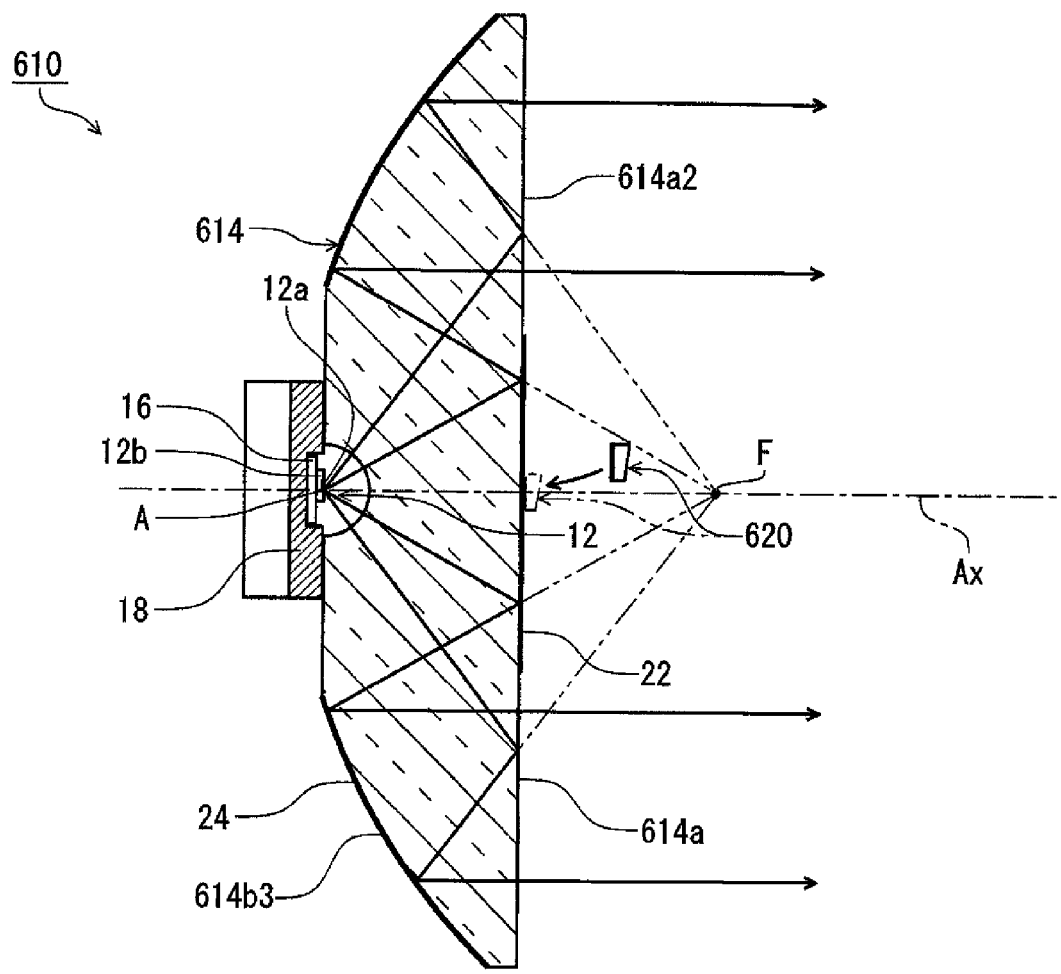
FIG. 15 is a sectional view taken along the line XV-XV in FIG. 14.
Figure 16:
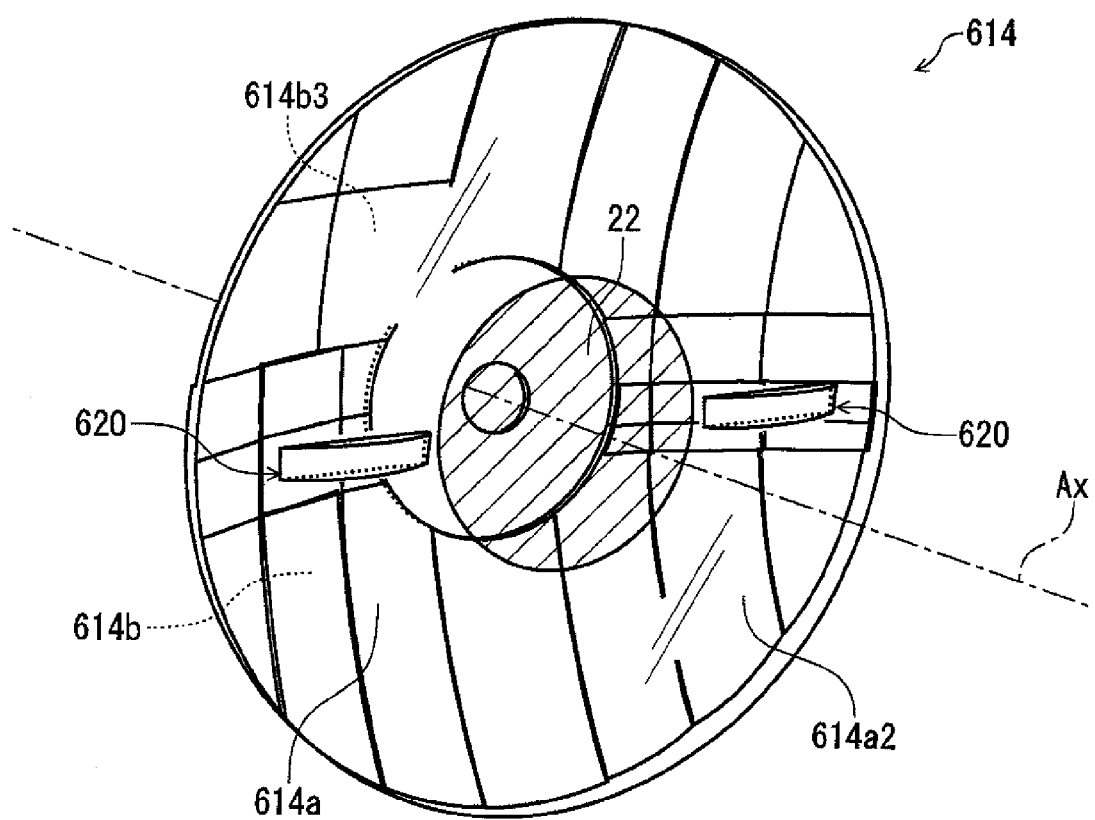
FIG. 16 is a perspective view showing a light transmissive member according to the first modified example of the third embodiment.

FIG. 14 is a similar diagram to FIG. 11 which shows a vehicle lamp 610 according to the first modified example. Additionally, FIG. 15 is a sectional view taken along the line XV-XV in FIG. 14, and FIG. 16 is a perspective view of a light transmissive member 614 of the vehicle lamp 610.

As shown in these figures, the vehicle lamp 610 differs from the vehicle lamp 510 of the third embodiment with respect to a partial configuration of the light transmissive member 614.

Namely, in this modified example, portions corresponding to the pair of left and right lens portions 514c of the light transmissive member 514 of the third embodiment are configured as separate members.

Specifically, in this first modified example, lens portions like the pair of left and right lens portions 514c of the third embodiment are not formed on a front surface 614a of the light transmissive member 614. Instead, a pair of left and right lens members 620 having the same function of the pair of left and right lens portions 514c are fixed to the front surface 614a of the light transmissive member 614 with an adhesive or a holding member.

Then, in the pair of left and right lens members 620, part of light that is emitted from a light emitting element 12 and which is internally reflected again on an annular area 614b3 on a rear surface 614b of the light transmissive member 614 is caused to be emitted to the front as light that is oriented upwards, whereby an OHS illuminating light distribution pattern as shown in FIG. 5 is formed.

In this case, the pair of left and right lens members 620 are fixed to a horizontal plane containing an optical axis Ax on a peripheral area 614a2 of the front surface 614a of the light transmissive member 614 in positions lying on left- and right-hand sides of the optical axis Ax. Namely, the pair of left and right lens members 620 are situated forwards of reflecting zones Z4, Z8 which are situated on left- and right-hand sides of the optical axis Ax.

Also when the configuration of the first modified example is adopted, the same function and advantage as those obtained by the third embodiment can be obtained.

Moreover, as in the first modified example, the lens portions are made up of the lens members 620 which are separate from the light transmissive member 614, whereby the formation of the OHS illuminating light distribution pattern PA can be selected by selecting the mounting or dismounting of the lens members 620.

Next, a second modified example of the third embodiment will be described.

Figure 17:
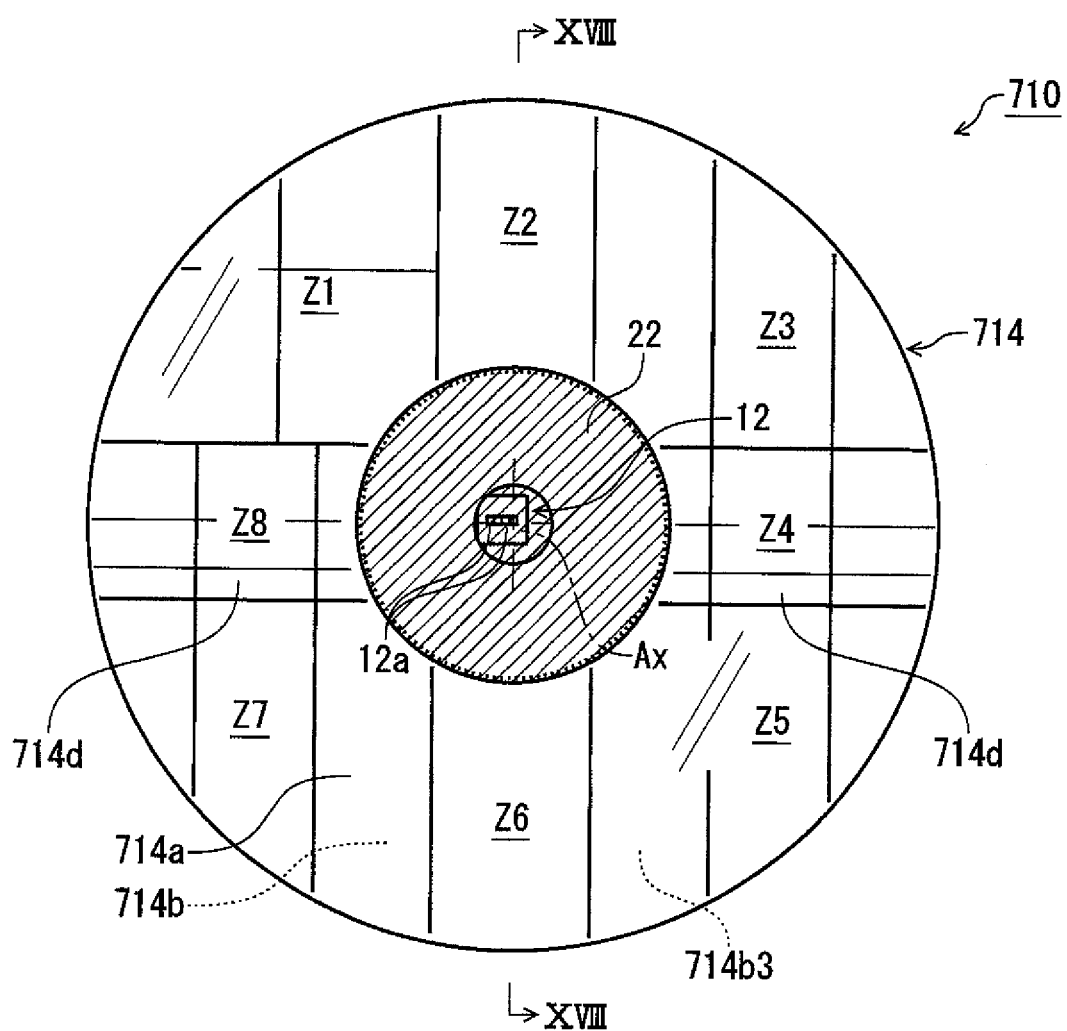
FIG. 17 is a diagram similar to FIG. 11 which shows a second modified example of the third embodiment.
Figure 18:
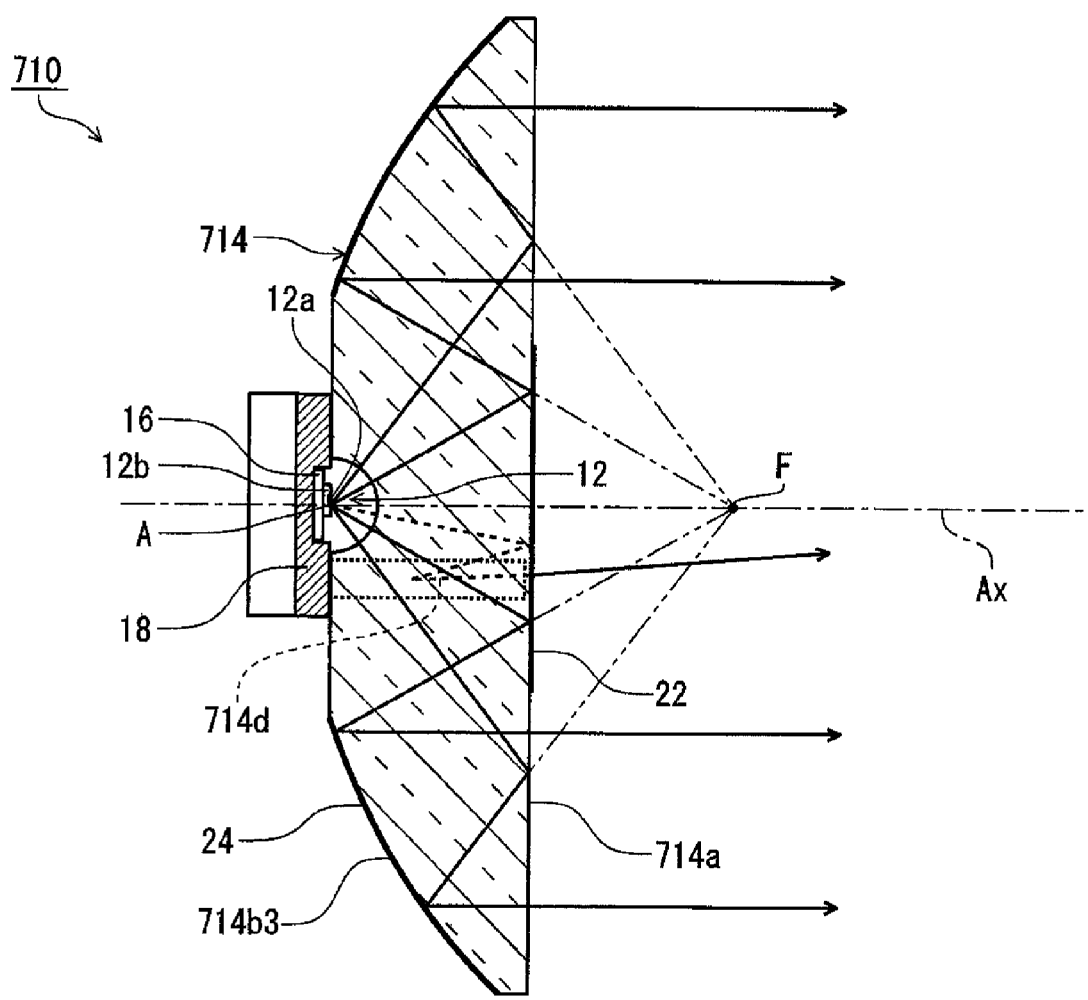
FIG. 18 is a sectional view taken along the line XVIII-XVIII in FIG. 17.
Figure 19:
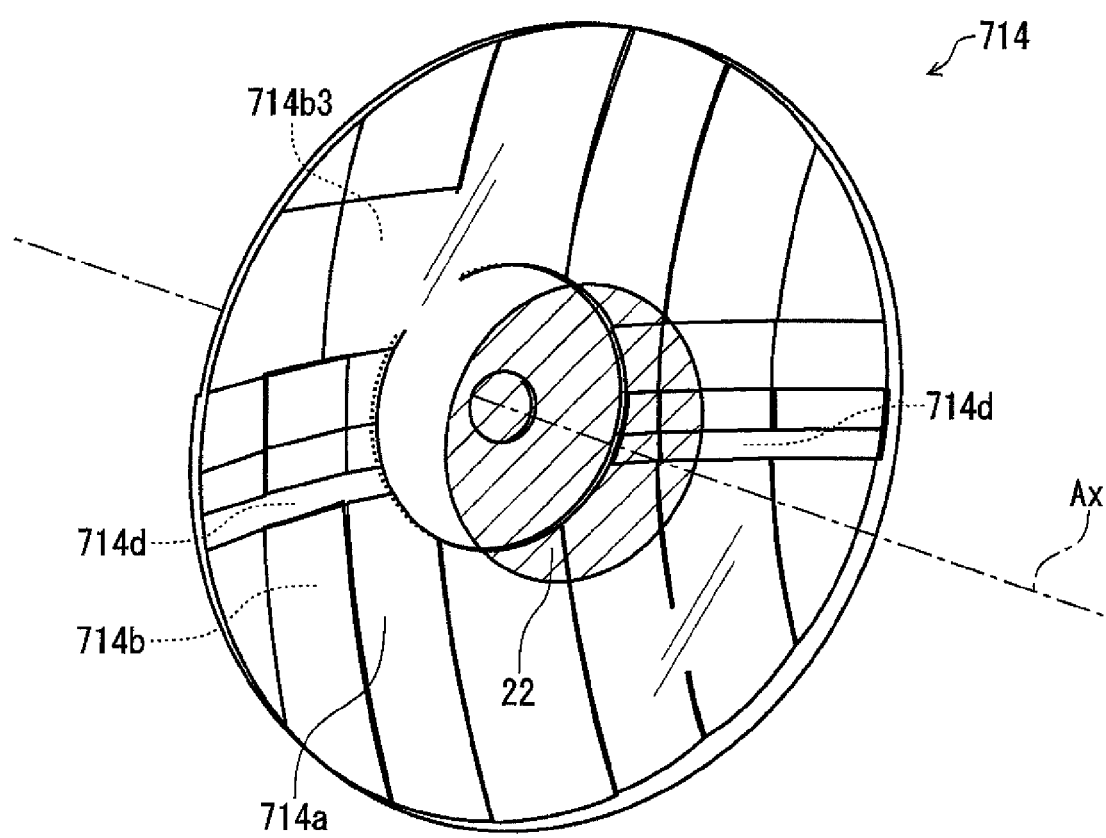
FIG. 19 is a perspective view showing a light transmissive member according to the second modified example of the third embodiment.

FIG. 17 is a diagram similar to FIG. 11 which shows a vehicle lamp 710 according to the second modified example. Additionally, FIG. 18 is a sectional view taken along the line XVIII-XVIII in FIG. 17, and FIG. 19 is a perspective view of a light transmissive member 714 of the vehicle lamp 710.

As shown in these figures, this vehicle lamp 710 differs from that of the third embodiment with respect to a partial configuration of the light transmissive member 714.

Namely, in this second modified example, lens portions like the pair of left and right lens portions 514c of the third embodiment are not formed on a front surface 714a of the light transmissive member 714. Instead, a pair of left and right reflecting portions 714d are formed on an annular area 714b3 on a rear surface 714b of the light transmissive member 714. In this case, the pair of left and right reflecting portions 714d are situated at lower end portions of reflecting zones Z4, Z8 that are situated on left- and right-hand sides of an optical axis Ax on the annular area 714b3.

Then, these left and right reflecting portions 714d are configured to reflect part of light that is emitted from a light emitting element 12 and which is internally reflected again at the annular area 714b3 on the rear surface 714b of the light transmissive member 714 so as to emit the reflected light to the front from the front surface 714a of the light transmissive member 714 as light that is oriented upwards to thereby form an OHS illuminating light distribution pattern PA as shown in FIG. 5.

Also when the configuration of the second modified example is adopted, the same function and advantage as those obtained by the third embodiment can be obtained.

Moreover, by adopting the configuration of this second modified example in which the pair of left and right reflecting portions 714d for forming the OHS illuminating light distribution pattern are formed at the annular area 714b3 on the rear surface 714b of the light transmissive member 714, the aforesaid function and advantage can be obtained without providing a projecting portion on the light transmissive member 714.

Next, a fourth embodiment of the invention will be described.

Figure 20:
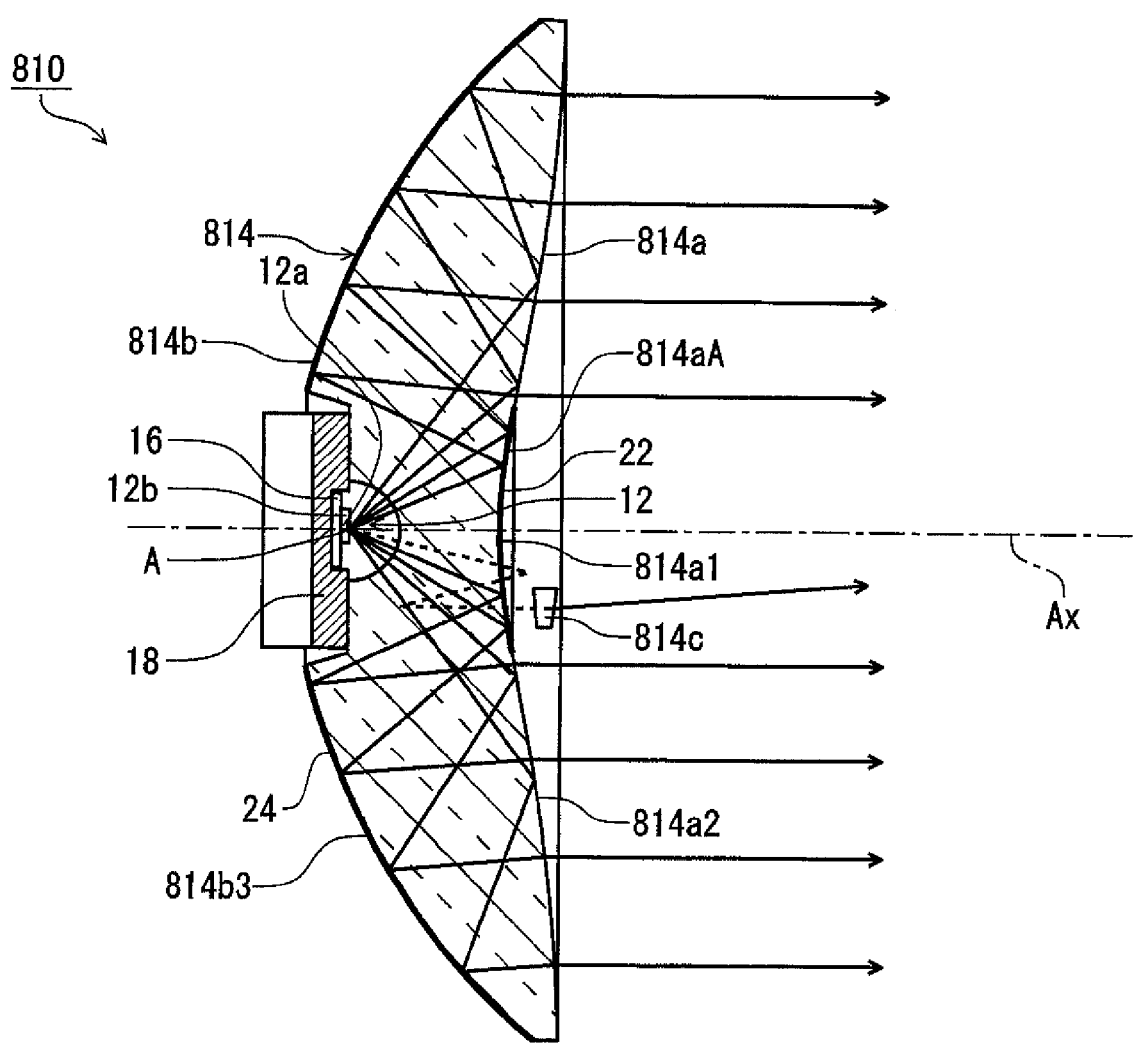
FIG. 20 is a diagram similar to FIG. 12 which shows a vehicle lamp according to a fourth embodiment of the invention.

FIG. 20 is a front view of a vehicle lamp 810 according to the fourth embodiment.

As shown in the same figure, a basic configuration of the vehicle lamp 810 according the fourth embodiment is similar to that of the vehicle lamp 510 of the third embodiment of the invention. However, surface configurations of a front surface 814a and a rear surface 814b of a light transmissive member 814 differ from those of the light transmissive member 514 of the vehicle lamp 510.

Namely, in the vehicle lamp 810 according to the fourth embodiment, the front surface 814a of the light transmissive member 814 is formed into a paraboloidal plane having a concavely curved surface portion 814aA in a center thereof. In this case, this paraboloidal plane is made up of a smooth curved surface that is generated by the rotation of a parabola about an optical axis Ax.

Then, also in this vehicle lamp 810, light emitted from a light emitting element 12 is caused to enter the light transmissive member 814 in such a manner that the light is internally reflected on the front surface 814a of the light transmissive member 814 and is then internally reflected again on the rear surface 814b of the light transmissive member 814 for emission from the front surface 814a of the light transmissive member 814 to thereby form a low beam light distribution pattern PL for the left-hand side traffic as shown in FIG. 5.

To realize this, also in the vehicle lamp 810, as with the vehicle lamp 510, an annular area 814b3, on which a reflecting film 24 is formed, of the rear surface 814b of the light transmissive member 814 is made up of a plurality of curved planes. In this case, each of the plurality of curved planes is formed based on as a reference plane a paraboloidal plane whose configuration is set so that light that comes from a point A on the light emitting element 12 and which is internally reflected on the front surface 814a of the light transmissive member 814 is internally reflected again and is then emitted from the front surface 814a in a direction parallel to the optical axis Ax.

In addition, also in the vehicle lamp 810, as with the vehicle lamp 510, a reflecting treatment is applied to a central area 814a1 on the front surface 814a of the light transmissive member 814 (that is, a central portion of a concavely curved surface portion 814aA), whereby a reflecting film 22 is formed.

As with the central area 514a1 of the vehicle lamp 510, this central area 814a1 is a circular area defined about the optical axis Ax. An outer circumferential edge of the central area 814a1 is set to lie near a position where an incident angle of light that is emitted from the light emitting element 12 (to be precise, light from the point A) and which reaches the front surface 814a of the light transmissive member 814 becomes a critical angle. In this case, the front surface 814a of the light transmissive member 814 is formed into the paraboloidal plane having the concavely curved surface portion 814aA in the center thereof, and therefore, an outer circumferential edge of the central area 814a1 of the light transmissive member 814 is situated closer to the optical axis Ax than that of the central area 514a1 of the vehicle lamp 510.

In addition, since the outer circumferential edge of the central area 814a1 on the front surface 814a of the light transmissive member 814 is situated closer to the optical axis Ax, reflected light reflected from the annular area 814b3 on the rear surface 814b of the light transmissive member 814 is made difficult to enter the central area 814a1 accordingly. Because of this, an inner circumferential edge of the annular area 814b3 is also situated closer to the optical axis Ax than that of the annular area 54b3 of the vehicle lamp 510.

Also, in the light transmissive member 814 of the fourth embodiment, a lens portion 814c is formed which is similar to the lens portion 514c of the light transmissive member 514 of the third embodiment of the invention.

Namely, a pair of lens portions 814c are formed on a peripheral area 814a2 on the front surface 814a of the light transmissive member 814 in positions that lie on left- and right-hand sides of the optical axis Ax and which are spaced slightly downwards away from a horizontal plane that contains the optical axis Ax, these lens portions 814c being configured to cause light that is emitted from the light emitting element 12 and which is internally reflected again on the annular area 814b3 on the rear surface 814b of the light transmissive member 814 to be emitted towards the front of the lamp as light that is oriented slightly upwards.

These lens portions 814c are each formed into a horizontally elongated external shape which projects from the front surface 814a and each have a substantially spherical surface configuration. These lens portions 514c are each configured so as to cause part of light that is emitted from the light emitting element 12 and which enters the light transmissive member 814 to be emitted as diffuse light that is slightly diffused in a substantially upward direction with respect to a vertical direction and as light that is diffused horizontally to some extent with respect to a horizontal direction.

Also, in the case of the configuration of the fourth embodiment being adopted, the same function and advantage as those obtained by the third embodiment of the invention can be obtained.

In particular, in the fourth embodiment, since the front surface 814a of the light transmissive member 814 is formed into the paraboloidal plane having the concavely curved surface portion 814aA in the center thereof, an area on the front surface 814a where a total reflection occurs is wider than where the front surface is formed into the flat plane. Because of this, the size of the central area 814a1 to which the reflecting treatment is applied can be reduced. Consequently, the range of the annular area 814b3 on the rear surface 814b of the light transmissive member 814 to which the reflecting treatment is applied can be spread accordingly, thereby making it possible to realize an effective use of light.

In addition, in this fourth embodiment, the lens portions 814c are formed on the front surface 814a of the light transmissive member 814, and the front surface 814a of the light transmissive member 814 is formed into the paraboloidal plane having the concavely curved surface portion 814aA in the center thereof. Thus, although the lens portions 814c are formed on the front surface 814a, the forward projection of the light transmissive member 814 can be suppressed, whereby the vehicle lamp 810 can be maintained thin.

Note that various variations like those described at the end of the description of the third embodiment of the invention can also be added to this fourth embodiment.

Next, a modified example of the fourth embodiment of the invention will be described.

Figure 21:
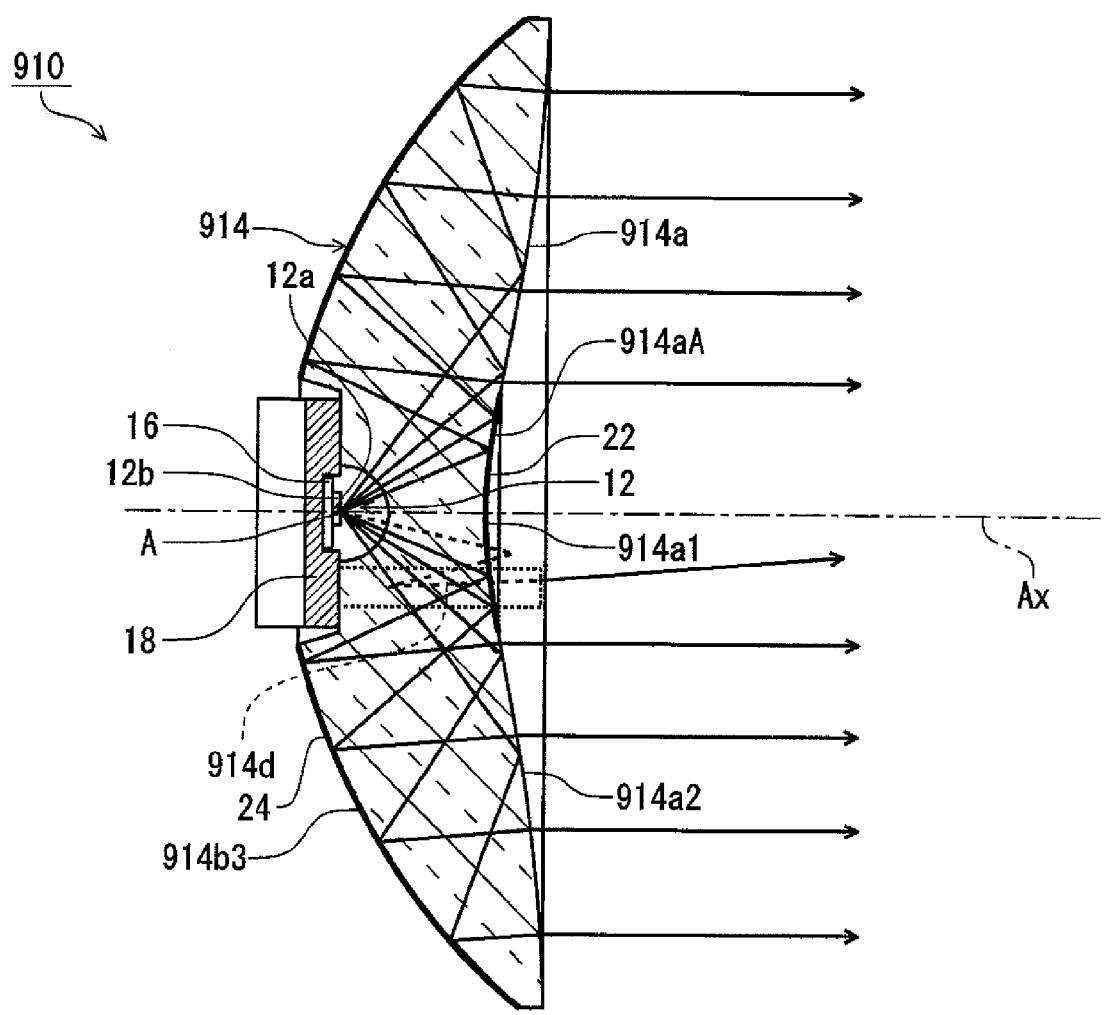
FIG. 21 is a diagram similar to FIG. 12 which shows a vehicle lamp according to a first modified example of the fourth embodiment of the invention.

FIG. 21 is a diagram similar to FIG. 15 which shows a vehicle lamp 910 according to this modified example.

As shown in the same figure, this vehicle lamp 910 differs from the fourth embodiment with respect to a partial configuration of a light transmissive member 914.

Namely, in this modified example, the pair of left and right lens portions 814c of the fourth embodiment are not formed on a front surface 914a of the light transmissive member 914. Instead, a pair of left and right reflecting portions 914d are formed at an annular area 914b3 on a rear surface 914b of the light transmissive member 914. In this case, the pair of left and right reflecting portions 914d are situated at lower end portions of reflecting zones which are situated on left- and right-hand sides of an optical axis Ax on the annular area 914b3.

Then, the pair of left and right reflecting portions 914d reflect part of light that is emitted from a light emitting element 12 and which is internally reflected again at the annular area 914b3 on the rear surface 914b of the light transmissive member 914 slightly upwards so as to be emitted towards the front as light that is oriented upwards, whereby an OHS illuminating light distribution pattern PA as shown in FIG. 5 is formed.

Also when the configuration of this modified example is adopted, the same function and advantage as those obtained by the fourth embodiment can be obtained.

Moreover, in this modified example, the pair of left and right reflecting portions 914d for forming the OHS illuminating light distribution pattern PA are formed at the annular area 914b3 on the rear surface 914b of the light transmissive member 914. Thus, the aforesaid function and advantage can be obtained without providing a projecting portion on the light transmissive member 914.

Note that the numeric values shown as the specifications in the embodiments and modified examples are only examples, and hence, these specification values may, of course, be set to different values as required.

What is claimed is:

1. A vehicle lamp comprising:
a light emitting element disposed to be directed to a front side of the lamp; and
a light transmissive member disposed closer to the front side of the lamp than the light emitting element, the light transmissive member comprising a front surface formed into a flat plane or a paraboloidal plane having a concavely curved surface portion in a center thereof and a rear surface having a light entering area where light from the light emitting element is caused to enter and an annular area situated on an outer circumferential side of the light entering area, the annular area having a plurality of curved surfaces and having a reflecting film formed thereon,
wherein the light emitting element and the light transmissive member are configured and arranged so that light which is emitted from the light emitting element and enters the light transmissive member is internally reflected on the front surface of the light transmissive member and is then internally reflected again on the rear surface of the light transmissive member for emission from the front surface of the light transmissive member to thereby form a first light distribution pattern having a cut-off line at an upper end portion thereof, and
wherein the light transmissive member has a lens portion provided on one of the front surface or the rear surface of the light transmissive member and configured to cause part of the light which is emitted from the light emitting element and enters the light transmissive member to be emitted towards the front side of the lamp as direct emitted light that is upwardly oriented so as to form a second light distribution pattern in a position that is spaced upwardly away from the cut-off line.

2. The vehicle lamp as set forth in claim 1,
wherein the lens portion is formed on the light entering area of the rear surface of the light transmissive member,
wherein the front surface of the light transmissive member has a central area including a first portion on which a reflecting film is formed and a second portion on which a reflecting film is not formed, and
wherein the second portion is a portion at which light emitted from the light emitting element and enters the light transmissive member from the lens portion arrives.

3. The vehicle lamp as set forth in claim 1,
wherein the lens portion is formed on the front surface of the light transmissive member.

4. The vehicle lamp as set forth in claim 3,
wherein the front surface of the light transmissive member has a central area including a first portion on which a reflecting film is formed and a second portion on which a reflecting film is not formed, and
wherein the lens portion is formed at the second portion.

5. A vehicle lamp comprising:
a light emitting element disposed to be directed to a front side of the lamp; and
a light transmissive member disposed closer to the front side of the lamp than the light emitting element, the light transmissive member comprising a front surface formed into a flat plane or a paraboloidal plane having a concavely curved surface portion in a center thereof and a rear surface having a light entering area where light from the light emitting element is caused to enter and an annular area situated on an outer circumferential side of the light entering area, the annular area having a plurality of curved planes surfaces and having a reflecting film formed thereon,
wherein the light emitting element and the light transmissive member are configured and arranged so that light which is emitted from the light emitting element and enters the light transmissive member is internally reflected on the front surface of the light transmissive member and is then internally reflected again on the rear surface of the light transmissive member for emission from the front surface of the light transmissive member to thereby form a first light distribution pattern having a cut-off line at an upper end portion thereof, and
wherein the light transmissive member has one of a lens portion or a reflecting portion provided on one of the front surface or the rear surface of the light transmissive member and configured to cause part of the light which is emitted from the light emitting element and is internally reflected again on the rear surface of the light transmissive member to be emitted towards the front side of the lamp as light that is upwardly oriented so as to form a second light distribution pattern in a position that is spaced upwardly away from the cut-off line.

6. The vehicle lamp as set forth in claim 5,
wherein the light emitting element has a horizontally elongated substantially rectangular light emitting surface, and
wherein the lens portion or the reflecting portion is provided on a cross-shaped area that extends in a belt-like fashion vertically and horizontally about the center of the light emitting element when looking at the lamp from a front of the lamp.

7. The vehicle lamp as set forth in claim 5,
wherein the lens portion is formed on the front surface of the light transmissive member.

8. The vehicle lamp as set forth in claim 5,
wherein the lens portion is mounted on the front surface of the light transmissive member as a separate lens member.

9. The vehicle lamp as set forth in claim 5,
wherein the reflecting portion is formed at the annular area.

* * * * *